United States Patent
Huang et al.

(10) Patent No.: US 9,481,793 B2
(45) Date of Patent: Nov. 1, 2016

(54) DEVELOPMENT OF A RENEWABLE CARBON-BASED BIO-MODIFIER FOR ASPHALT CEMENT

(71) Applicant: University of Tennessee Research Foundation, Knoxville, TN (US)

(72) Inventors: Baoshan Huang, Knoxville, TN (US); Xiaofei Philip Ye, Knoxville, TN (US); Sheng Zhao, Fairbanks, AK (US); Xiang Shu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 14/535,830

(22) Filed: Nov. 7, 2014

(65) Prior Publication Data

US 2015/0128829 A1    May 14, 2015

Related U.S. Application Data

(60) Provisional application No. 61/901,511, filed on Nov. 8, 2013.

(51) Int. Cl.
*C08L 95/00* (2006.01)
*C01B 31/02* (2006.01)
(Continued)

(52) U.S. Cl.
CPC .............. *C08L 95/00* (2013.01); *C01B 31/02* (2013.01); *C04B 18/101* (2013.01); *C04B 20/04* (2013.01);
(Continued)

(58) Field of Classification Search
CPC .............. C08L 95/00; C08L 2555/40; C08L 2555/52; C08L 2555/82; C09D 195/00; C09J 195/00; C09J 197/02; C04B 26/26; C10C 3/00; B01J 8/00; Y02E 50/00; C08K 7/02; C08K 7/04; C08K 7/06; C08K 7/08; C08K 7/10; C08K 7/12; C08K 7/14; C09L 2666/02

See application file for complete search history.

(56) References Cited

U.S. PATENT DOCUMENTS

| 6,512,090 | B1 * | 1/2003 | Suchanec | C08L 95/005 |
| | | | | 106/220 |
| 8,361,186 | B1 * | 1/2013 | Shearer | C01B 31/02 |
| | | | | 252/373 |

(Continued)

OTHER PUBLICATIONS

Abtahi et al., "Fiber-reinforced Asphalt-concrete—A Review," Construction and Building Materials, vol. 24, No. 6, pp. 871-877 (2010).

(Continued)

*Primary Examiner* — Pegah Parvini
*Assistant Examiner* — Alexandra M Moore
(74) *Attorney, Agent, or Firm* — Jenkins, Wilson, Taylor & Hunt

(57) ABSTRACT

A bio-modifier for asphalt is provided that comprises non-wood bio-char. In some embodiments, the bio-char comprises pyrolyzed biomass from a bio-fuel crop and/or comprises pyrolyzed grass. The asphalt modifier can improve the performance of asphalt compositions such as asphalt binder compositions and compositions comprising asphalt binder and aggregate. For example, the bio-modifier can improve the temperature susceptibility of asphalt binder compositions and increase the rutting resistance, moisture and cracking resistance of hot mix asphalt compositions. In addition, methods of preparing the bio-modifier composition, methods of preparing modified asphalts comprising the bio-modifier, and modified asphalt compositions are provided.

31 Claims, 21 Drawing Sheets

(51) Int. Cl.

| | |
|---|---|
| *C09C 1/48* | (2006.01) |
| *C09C 1/44* | (2006.01) |
| *C04B 18/10* | (2006.01) |
| *C04B 26/26* | (2006.01) |
| *C04B 20/04* | (2006.01) |
| *C04B 111/00* | (2006.01) |

(52) U.S. Cl.
CPC .............. *C04B 26/26* (2013.01); *C09C 1/44* (2013.01); *C09C 1/48* (2013.01); *C04B 2111/0075* (2013.01); *C08L 2555/34* (2013.01); *C08L 2555/52* (2013.01); *Y02W 30/92* (2015.05); *Y02W 30/97* (2015.05); *Y10T 428/2982* (2015.01)

(56) References Cited

U.S. PATENT DOCUMENTS

| | | | | |
|---|---|---|---|---|
| 2011/0294927 | A1* | 12/2011 | Williams | ............... C08L 23/06 524/59 |
| 2012/0090221 | A1* | 4/2012 | Banasiak | ............... C10B 49/10 44/300 |

OTHER PUBLICATIONS

Alliotti, "Carbon Black—Its Nature and Possible Effects on the Characteristics of Bituminous Road Binders," Proceedings Australian Road Research Board, vol. 1, pp. 912-917 (1962).
Bahia et al., "The SHRP Binder Rheological Parameters: Why are They Required and How Do They Compare to Conventional Properties," Transportation Research Board, Preprint Paper No. 950793, (1995).
Bahia, "The Use of Crumb Rubber and Carbon Black for Modification of Paving-Grade Asphalt Binders," Carbon Black World 94, Houston, Texas, 19 pages (1994).
Brewer et al., "Characterization of Biochar from Fast Pyrolysis and Gasification Systems," Environmental Progress & Sustainable Energy, vol. 28, No. 3, pp. 386-396 (2009).
Buttlar et al., "Development and Evaluation of the New Strategic Highway Research Program Measurement and Analysis System for Indirect Tensile Testing at Low Temperatures," Transportation Research Record 1454, pp. 163-171 (1994).
Buttlar et al., "Understanding Asphalt Mastic Behavior Through Micromechanics," Transportation Research Record: Journal of the Transportation Research Board, vol. 1681, pp. 157-169 (1999).
Chaala et al., "Rheological Properties of Bitumen Modified with Pyrolytic Carbon Black," Fuel, vol. 75, No. 13, pp. 1575-1583 (1996).
Chebil et al., "Use of Softwood Bark Charcoal as a Modifier for Road Bitumen," Fuel, vol. 79, No. 6, pp. 671-683 (2000).
Chen et al., Evaluation of Moisture Damage in Hot Mix Asphalt Using Simple Performance and Superpave Indirect Tensile Tests, Construction and Building Materials, vol. 22, No. 9, pp. 1950-1962 (2008).
Cleven, "Investigation of the Properties of Carbon Fiber Modified Asphalt Mixtures," Michigan Technological University, Department of Chemical Engineering, M.S. Thesis (2000).
Demirbas et al., "Recent Advances on the Production and Utilization Trends of Bio-fuels: A Global Perspective," Energy Conservation and Management, vol. 47, pp. 2371-2381 (2006).
Fini et al., Chemical Chracterization of Biobinder from Swine Manure: Sustainable Modifier for Asphalt Binder, Journal of Materials in Civil Engineering, vol. 23, pp. 1506-1513 (2011).
Glover et al., "Development of a New Method for Assessing Asphalt Binder Durability with Field Validation," Report No. FHWA/TX-05/1872-2, Texas Department of Transportation, Research and Technology Implementation Office, Austin, Texas, (2005).
Goodrich, "Asphalt and Polymer Modified Asphalt Properties Related to the Performance of Asphalt Concrete Mixes," Proceedings of the Association of Asphalt Paving Technologists, vol. 57, pp. 116-175 (1988).
Graham et al., "Laboratory Evaluation of Tensile Strength and Energy Absorbing Properties of Cement Mortar Reinforced with Micro- and Meso-sized Carbon Fibers," Construction and Building Materials, vol. 44, pp. 751-756 (2013).
Hill et al., "Bioasphalt from Urban Yard Waste Carbonization," Report No. FHWA/OH-2011/13, Ohio Department of Transportation, Columbus, Ohio, (2011).
Huang et al., "Effects of Electrically Conductive Additives on Laboratory-Measured Properties of Asphalt Mixtures," Journal of Materials in Civil Engineering, vol. 21, No. 10, pp. 612-617 (2009).
Huang et al., "Effects of Mineral Fillers on Hot-Mix Asphalt Laboratory Measured Properties," International Journal of Pavement Engineering, vol. 8, No. 1, pp. 1-9 (2007).
Huang et al., "Laboratory Investigation of Cracking Resistance of Hot-Mix Asphalt Field Mixtures Containing Screened Reclaimed Asphalt Pavement," Journal of Materials in Civil Engineering, vol. 23, No. 11, pp. 1535-1543.
Huang et al., "Louisiana Experience with Crumb Rubber-Modified Hot-Mix Asphalt Pavement," Transportation Research Record: Journal of the Transportation Research Board, 1789, pp. 1-13 (2002).
Huang et al., "Using Notched Semi Circular Bending Fatigue Test to Characterize Fracture Resistance of Asphalt Mixtures," Engineering Fracture Mechanics, vol. 109, pp. 78-88 (2013).
Jahromi et al., "Carbon Fiber Reinforced Asphalt Concrete," The Arabian Journal for Science and Engineering, vol. 33, No. 2B, pp. 355-364 (2008).
Khosla, "Effect of the Use of Modifiers on Performance of Asphatic Pavements" Transportation Research Record 1317, pp. 10-22 (1991).
Kim et al., "Surface Functionality and Carbon Structures in Lignocellulosic-derived Biochars Produced by Fast Pyrolysis," Energy Fuels, vol. 25, No. 10, pp. 4693-4703 (2011).
Lehmann et al., "Stability of Biochar in Soil" in Biochar for Environmental Management: Science and Technology, Earthscan: London, pp. 183-205 (2009).
Lehmann, "Bio-energy in the Black," Frontiers in Ecology and the Environment, vol. 5, No. 7, pp. 381-387 (2007).
McGinnis et al., "Background of Superpave Asphalt Binder Test Methods," Report No. FHWA-SA-94-069, Federal Highway Administration, Washington, D.C., (1994).
Mull et al., "Fracture Resistance Characterization of Chemically Modified Crumb Rubber Asphalt Pavement," Journal of Materials Science, vol. 37, No. 3, pp. 557-566 (2002).
Palit et al., "Laboratory Evaluation of Crumb Rubber Modified Asphalt Mixtures," Journal of Materials in Civil Engineering, vol. 16, No. 1, pp. 45-53 (2004).
Park et al., Using Pyrolized Carbon Black (PCB) from Waste Tires in Asphalt Pavement (Part 1, Limestone Aggregate), Publication FHWA/IN/JHRP-95/10, Joint Highway Research Project, Indiana Department of Transportation and Purdue University, West Lafayette, Indiana, (1996).
Roque et al., "Hot Mix Asphalt Fracture Mechanics: A Fundamental Crack Growth Law for Asphalt Mixtures," Journal of the Association of Asphalt Paving Technologists, vol. 71, 23 pages (2002).
Roque et al., "The Development of a Measurement and Analysis System to Accurately Determine Asphalt Concrete Properties Using the Indirect Tensile Mode," Journal of the Association of Asphalt Paving Technologists, vol. 61, pp. 304-332 (1992).
Rostler et al., "Carbon Black as a Reinforcing Agent for Asphalt," Association of Asphalt Paving Technologists Proceedings, vol. 46, pp. 376-410 (1977).
Ruan et al., "An Investigation of Asphalt Durability: Relationships Between Ductility and Rheological Properties for Unmodified Asphalts," Petroleum Science and Technology, vol. 21, Issue. 1-2, pp. 231-254 (2003).
Schmidt et al., "Black Carbon in Soils and Sediments: Analysis, Distribution, Implications, and Current Challenges," Global Biogeochemical Cycles, vol. 14, No. 3, pp. 777-793 (2000).

(56) References Cited

OTHER PUBLICATIONS

Shu et al., "Evaluation of Cracking Resistance of Recycled Asphalt Mixture Using Semi-Circular Bending Test," Paving Materials and Pavement Analysis, GeoShanghai, pp. 1-8 (2010).

Shu et al., "Laboratory Evaluation of Fatigue Characteristics of Recycled Asphalt Mixture," Construction and Building Materials, vol. 22, No. 7, pp. 1323-1330 (2008).

Shu et al., "Laboratory Evaluation of Moisture Susceptibility of Foamed Warm Mix Asphalt Containing High Percentages of RAP," Construction and Building Materials, vol. 35, pp. 125-130 (2012).

Taha et al., "Evaluation of Coke Dust-Modified Asphalt Using Superpave," Civil Engineering, vol. 10, No. 3, pp. 174-179 (1998).

Tang et al., "Carbonization of Cellulose Fibers—I. Low Temperature Pyrolysis," Carbon, vol. 2, No. 3, pp. 211-220 (1964).

Walters et al., "Enhancing Asphalt Rheological Behavior and Aging Susceptibility Using Bio-Char and Nano-Clay," American Journal of Engineering and Applied Sciences, vol. 7, No. 1, pp. 66-76 (2014).

Warren et al., "Superpave Asphalt Binder Test Methods-an Illustrated Overview," Report No. FHWA-SA-94-068, Federal Highway Administration, Washington, D.C., (1994).

Wu et al., "Fracture Resistance Characterization of Superpave Mixtures Using the Semi-Circular Bending Test," Journal of ASTM International, vol. 2, No. 3, pp. 1-15 (2005).

Wu et al., "Investigation of the Conductivity of Asphalt Concrete Containing Conductive Fillers," Carbon, vol. 43, No. 7, pp. 1358-1363 (2005).

Xiao et al., "Compressive Behavior of Concrete Confined by Carbon Fiber Composite Jackets," Journal of Materials in Civil Engineering, vol. 12, No. 2, pp. 139-146 (2000).

Xiao et al., "Influence of Carbon Nanoparticles on the Rheological Characteristics of Short-Term Aged Asphalt Binders," Journal of Materials in Civil Engineering, vol. 23, No. 4, pp. 423-431 (2011).

Yao et al., "Behavior of Asphalt Mixtures with Carbon Black Reinforcement," Association of Asphalt Paving Technologists, vol. 55, pp. 564-585 (1986).

Yao et al., "Rheological Properties and Chemical Analysis of Nanoclay and Carbon Microfiber Modified Asphalt with Fourier Transform Infrared Spectroscopy," Construction and Building Materials, vol. 38, pp. 327-337 (2013).

Yildirim, "Polymer Modified Asphalt Binders," Construction and Building Materials, vol. 21, No. 1, pp. 66-72 (2007).

Zhao et al., "Characterizing Rheological Properties of Binder and Blending Efficiency of Asphalt Paving Mixtures Containing RAS through GPC," Journal of Materials in Civil Engineering, vol. 26, pp. 941-946 (2014).

Zhao et al., "Comparative Evaluation of Warm Mix Asphalt Containing High Percentages of Reclaimed Asphalt Pavement," Construction and Building Materials, vol. 44, pp. 92-100 (2013).

Zhao et al., "Development of a Carbon-Based Bio-Modifier for Asphalt Cement," 50th Petersen Asphalt Research Conference, Laramie, Wyoming, 31 pages, (Jul. 15-17, 2013).

Zhao et al., "Laboratory Investigation of Bio-Char Modified Asphalt Mixture," Transportation Research Record 2445, Transportation Research Board of the National Academies, pp. 56-63 (2014).

Zhao et al., "Utilizing Bio-char as a Bio-modifier for Asphalt Cement: A Sustainable Application of a Bio-fuel By-product," Fuel, vol. 133, pp. 52-62 (2014).

Zhao et al., "Laboratory Performance Evaluation of Warm Mix Asphalt Containing High Percentages of Reclaimed Asphalt Pavement," in Transportation Research Record 2294, Transportation Research Board of the National Academies, pp. 98-105 (2012).

* cited by examiner

DEVELOPMENT OF A RENEWABLE CARBON-BASED BIO-MODIFIER FOR ASPHALT CEMENT

RELATED APPLICATIONS

The presently disclosed subject matter claims the benefit of U.S. Provisional Patent Application Ser. No. 61/901,511, filed Nov. 8, 2013; the disclosure of which is incorporated herein by reference in its entirety.

TECHNICAL FIELD

The presently disclosed subject matter relates to modifiers for asphalt compositions, particularly modifiers comprising bio-char, and asphalt compositions comprising the modifiers. Methods of preparing the modifiers and asphalt compositions are also provided.

Abbreviations

° C.=degrees Celsius
$\delta$=phase angle
%=percentage
$\eta^*$=complex viscosity
$\eta'$=dynamic viscosity
$\mu m$=micrometers or microns
APA=asphalt pavement analyzer
$DCSE_f$=dissipated creep strain energy threshold
DSR=dynamic shear rheometer
G*=complex shear modulus
G'=storage modulus
HMA=hot mix asphalt
HTT=highest treatment temperature
Hz=hertz
IDT=indirect tension test
J=Joules
kJ=kilojoules
kPa=kilopascals
m=meters
min=minutes
mm=millimeters
mPa=millipascals
MPa=megapascals
$M_R$=resilient modulus
nm=nanometers
NMAS=nominal maximum aggregate size
Pa=Pascals
PAV=pressure aging vessel
PG=performance grade
rad=radian
RTFO=rolling thin film oven
s=seconds
SCB=semi-circular bending
SEM=scanning electron microscopy
SGC=SUPERPAVE™ gyratory compactor
TSR=tensile strength ratio

BACKGROUND

Asphalt binder (which can also be referred to as asphalt, bitumen or asphalt cement) is a petroleum residue available in many varieties depending upon its natural origins and on the industrial process used in its production. Chemically, asphalt binders are typically a mixture of aliphatic, aromatic and naphthenic hydrocarbons with high molecular weight and small quantities of organic acids, bases and heterocyclic components containing nitrogen and sulfur. Asphalt is a colloidal substance in which a dispersed phase comprising asphaltene is covered by a protective phase of polar resins in micelles which are dispersed in a phase comprising oils. The chemical nature of the various phases is not readily definable. Generally, however, the nucleus has characteristics that are more aromatic than naphthenic; the protective resins are prevalently naphthenic and the oils, which cover the micelles, have a paraffinic character. The properties of asphalt can be associated with the balance of the percentages of its components. Due to the difficulty of performing an exact chemical analysis, a classification is normally accepted which is based upon fractionated precipitation of the bitumen using selective solvents and an elution of the solubles in a chromatographic column (American Society for Testing and Materials (ASTM) Standard S2007-75). Identification of an asphalt or bitumen is made by combining the results of this analysis with the values of penetration, softening and penetration index. Physically, bitumen is a visco-elastic material, with viscous flow under slow stress and at high temperatures and more elastic behavior under rapid stress at low temperature.

Due to its wide availability, relatively low price, and ease of application, asphalt has found widespread use as a road-building material, notwithstanding its visco-elastic behavior. Intrinsic limitations can accompany the use of asphalt as a road-building material. Asphalt can demonstrate softening and unwanted flow at high temperatures, brittleness and unwanted fracturing at low temperatures, poor mechanical and elastic characteristics and a tendency to aging with exposure. Mineral aggregate is frequently added to asphalt (to provide "asphalt concrete") to modify its rheology and temperature susceptibility. Roads are frequently laid with a base course and binder layers that insulate the upper asphalt surface from the ground. The upper asphalt road surface can develop extremely hot temperatures during the summer months and extremely cold temperatures during the winter months. The rheology of asphalt is such that, notwithstanding mineral additives, at high temperatures, it will flow in response to stresses imposed by vehicular traffic and develop "ruts" that not only provide unacceptable surface for vehicular travel, but provide localized areas of unacceptable thickness which crack under loads imposed by vehicular traffic at cold temperatures during winter and form pits (often referred to as "chuckholes").

Efforts have been made to improve asphalt performance by adding various asphalt modifiers, including various types of polymers, as well as carbonaceous materials, such as carbon black and carbon fiber. For instance, carbon fibers have been added to asphalt in hopes that the high tensile strength of carbon fiber can increase the cracking resistance of asphalt pavement. See Abtahi, S. M., et al., *Construction and Building Materials*, 2010, 24(6): 871-877. Asphalt mixtures modified with meso-length carbon fibers show resistance to permanent deformation, high tensile strength at low temperatures and high fatigue resistance. See Cleven, M. A., "Investigation of the Properties of Carbon Fiber Modified Asphalt Mixtures." M. S. Thesis, Department of Chemical Engineering, Michigan Technological University, 2000; and Jahromi, S. G., and A. Khodai, The Arabian Journal for Science and Engineering, 2008, 33(2B): 355-364. However, it is believed that addition of meso-fibers could produce fiber clumps, leading to poor dispersion of fibers and non-uniform mixing. See Cleven, M. A., "Investigation of the Properties of Carbon Fiber Modified Asphalt Mixtures." M. S. Thesis, Department of Chemical Engineering, Michigan Technological University, 2000. Nano-sized fibers can also be used, and are expected to behave more like nanoparticles, allowing for more uniform mixing.

Carbon black has shown reinforcing effect on rubbers and has potential as an additive to asphalt binder due to their common carbon-based nature. See Chaala, A., et al., *Fuel*, 1996, 75(13): 1575-1583. Pelletized carbon black can reduce the temperature susceptibility of asphalt, improve rutting resistance at high temperatures, and reduce stripping potential. See Chaala, A., et al., *Fuel*, 1996, 75(13): 1575-1583; Rostler, F. S., et al., *Association for Asphalt Paving Technologists Proc.*, 1977, 46: 376-410; Khosla, N. P., *Transportation Research Record: Journal of the Transportation Research Board*, 1991, 1317: 10-22; Yao, Z., and L. C. Monismith, *Association of Asphalt Paving Technologists*, 1986, 55: 564-585; and Park, T., and C. W. Lovell, "Using Pyrolyzed Carbon Black from Waste Tires in Asphalt Pavement (Part 1, Limestone Aggregate);"Publication FHWA/IN/JHRP-95/10; Joint Highway Research Project, Indiana Department of Transportation and Purdue University, West Lafayette, Ind., 1996. Yet, fatigue and cracking resistance of asphalt mixtures modified by carbon black can remain a concern.

Accordingly, there is an on-going need for new asphalt modifiers for use in asphalt (i.e., in asphalt binder) and in asphalt mixtures (e.g., in asphalt concrete) that can improve performance. For example, there is a need for new modifiers that can reduce temperature susceptibility and/or increase rutting resistance, moisture resistance and/or cracking resistance of hot mix asphalts.

SUMMARY

In some embodiments, the presently disclosed subject matter provides a method for preparing a bio-modifier composition for asphalt, the method comprising: providing a non-wood bio-mass material; and treating the non-wood bio-mass material under conditions suitable to produce a bio-modifier composition comprising bio-char.

In some embodiments, providing a non-wood bio-mass material comprises providing a biomass material from a crop grown for the production of a biofuel. In some embodiments, the non-wood biomass material comprises a grass. In some embodiments, the grass is switchgrass.

In some embodiments, the treating comprises pyrolysis performed under a nitrogen atmosphere and/or under atmospheric pressure. In some embodiments, the highest treatment temperature (HTT) during pyrolysis is about 500° C. In some embodiments, the HTT during pyrolysis is about 400° C. In some embodiments, the pyrolysis is performed by increasing temperature from room temperature to a highest treatment temperature with a heating rate of about 15° C. per minute.

In some embodiments, the bio-char has an average particle size of about 150 µm or less. In some embodiments, the bio-char has an average particle size of about 75 µm or less.

In some embodiments, the presently disclosed subject matter provides a bio-modifier composition produced by providing a non-wood bio-mass material and treating the non-wood bio-mass material under conditions suitable to produce a bio-modifier composition comprising bio-char.

In some embodiments, the presently disclosed subject matter provides a bio-modifier composition for asphalt comprising bio-char. In some embodiments, the bio-char is derived from non-wood biomass. In some embodiments, the bio-char comprises pyrolyzed non-wood biomass. In some embodiments, the pyrolyzed non-wood biomass is pyrolyzed grass. In some embodiments, the pyrolyzed grass is pyrolyzed switchgrass.

In some embodiments, the bio-char has an average particle size of less than about 150 microns. In some embodiments, the bio-char has an average particle size of less than about 75 microns. In some embodiments, the bio-char has a porous and/or rough surface texture.

In some embodiments, the presently disclosed subject matter provides a method of preparing a modified asphalt composition, the method comprising combining a bio-modifier composition comprising bio-char with an asphalt composition. In some embodiments, the bio-char is derived from non-wood biomass. In some embodiments, the bio-char comprises pyrolyzed non-wood biomass. In some embodiments, the combining comprises mixing an asphalt composition with the bio-modifier composition to provide a mixture comprising about 20 weight % or less of the bio-modifier. In some embodiments, the mixture comprises about 10 weight % or less of the bio-modifier composition. In some embodiments, the asphalt composition comprises asphalt binder or asphalt binder and aggregate.

In some embodiments, the presently disclosed subject matter provides a modified asphalt composition produced by combining a bio-modifier composition comprising bio-char with an asphalt composition. In some embodiments, the bio-char is derived from non-wood biomass. In some embodiments, the bio-char comprises non-wood biomass. In some embodiments, the bio-char comprises pyrolyzed non-wood biomass.

In some embodiments, the presently disclosed subject matter provides a modified asphalt composition comprising a bio-modifier composition comprising bio-char. In some embodiments, the bio-char is derived from non-wood biomass. In some embodiments, the bio-char comprises non-wood biomass. In some embodiments, the bio-char comprises pyrolyzed non-wood biomass. In some embodiments, the modified asphalt composition further comprises asphalt binder or asphalt binder and aggregate.

It is an object of the presently disclosed subject matter to provide a renewable carbon-based bio-modifier composition for asphalt, asphalt compositions comprising the bio-modifiers, and methods of preparing the bio-modifier compositions and the asphalt compositions comprising them.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

FIG. 1 (upper left micrograph) shows bio-char produced from switchgrass using a slow pyrolysis (Tube-Furnace) method and having a highest treatment temperature (HTT) of 400 degrees Celsius (° C.). FIG. 1 (upper right micrograph) shows bio-char produced from switchgrass using the slow pyrolysis method and having a HTT of 500° C. FIG. 1 (lower left micrograph) shows bio-char produced from switchgrass using a fast pyrolysis (Microwave-reactor) method and having a HTT of 500° C. FIG. 1 (lower right micrograph) shows commercially available activated carbon. To the left of each micrograph is a scale bar corresponding to 25 microns (µm).

FIG. 2 (upper left micrograph) shows bio-char produced from switchgrass using a slow pyrolysis (Tube-Furnace) method and having a highest treatment temperature (HTT) of 400 degrees Celsius (° C.). FIG. 2 (upper right micrograph) shows bio-char produced from switchgrass using the slow pyrolysis method and having a HTT of 500° C. FIG. 2 (lower left micrograph) shows bio-char produced from switchgrass using a fast pyrolysis (Microwave-reactor) method and having a HTT of 500° C. FIG. 2 (lower right micrograph) shows commercially available activated carbon. To the left of each micrograph is a scale bar corresponding to 2.5 microns (μm).

FIG. 3 (upper left graph) shows the effect of modifier content by comparing unmodified asphalt binder (PG6422, diamonds) to binder containing 5 (ML05, squares), 10 (ML10, triangles), 15 (ML15, circles), or 20 (ML20, ж's) weight percentage (%) of bio-char produced using a fast pyrolysis (Microwave-reactor) method with a large particle size (less than 150 micron and greater than 75 micron). FIG. 3 (upper right graph) shows the effect of modifier type by comparing unmodified asphalt binder (PG6422, diamonds) to binder containing 10 weight % small particle (less than 75 microns) bio-char produced using the fast pyrolysis method (ML10, squares), binder containing 10 weight % small particle bio-char produced via a slow pyrolysis (Tube-Furnace method) with a highest treatment temperature (HTT) of 500° C. (T500S10, triangles); and binder containing 10 weight % commercially available activated carbon (C10, circles). FIG. 3 (lower left graph) shows the effect of particle size by comparing unmodified asphalt binder (PG6422, diamonds) to binder comprising 10 weight % small particle bio-char produced using the fast pyrolysis method (MS10, squares); binder comprising 10 weight % large particle bio-char produced using the fast pyrolysis method (ML10, triangles); binder comprising 10 weight % small particle bio-char produced using the slow pyrolysis method with a HTT of 500° C. (T500S10, circles); and binder comprising 10 weight % large particle bio-char produced using the slow pyrolysis method with a HTT of 500° C. (T500L10, ж's). FIG. 3 (lower right graph) shows the effect of HTT by comparing unmodified binder (PG6422, diamonds) to binder containing 10 weight % small particle bio-char produced using the slow pyrolysis method having a HTT of 400° C. (T400S10, squares) and binder containing 10 weight % small particle bio-char produced using a slow pyrolysis method having a HTT of 500° C. (T500S10, triangles). Select regions of the curves are also shown in enlarged views (areas in dotted line squares).

FIG. 4 (left-hand graph) shows the effect of modifier content by comparing unmodified asphalt binder (PG6422, diamonds) to binder comprising 5 (ML05, squares), 10 (ML10, triangles), 15 (ML15, circles), or 20 (ML20, ж's) weight percentage (%) large particle (less than 150 microns and greater than 75 microns) bio-char prepared by a fast pyrolysis (Microwave-reactor) method. FIG. 4 (right-hand graph) shows the effect of modifier type by comparing unmodified asphalt binder (PG6422, diamonds) to binder comprising 10 weight % small particle (75 micron or less) bio-char prepared by the fast pyrolysis method (MS10, squares); binder comprising 10 weight % small particle bio-char prepared by a slow pyrolysis (Tube-Furnace) method having a highest treatment temperature of 500° C. (T500S10, triangles); and binder comprising 10 weight % commercially available activated carbon (C10, circles).

FIG. 5 (left-hand graph) shows the effect of modifier content by comparing unmodified asphalt binder (PG6422, diamonds) to binder comprising 5 (ML05, squares), 10 (ML10, triangles), 15 (ML15, circles), or 20 (ML20, ж's) weight percentage (%) large particle (less than 150 microns and greater than 75 microns) bio-char prepared by a fast pyrolysis (Microwave-reactor) method. FIG. 5 (right-hand graph) shows the effect of modifier type by comparing unmodified asphalt binder (PG6422, diamonds) to binder comprising 10 weight % small particle (75 micron or less) bio-char prepared by the fast pyrolysis method (MS10, squares); binder comprising 10 weight % small particle bio-char prepared by a slow pyrolysis (Tube-Furnace) method having a highest treatment temperature of 500° C. (T500S10, triangles); and binder comprising 10 weight % commercially available activated carbon (C10, circles).

FIG. 6 (upper left graph) shows how modifier content affects complex viscosity at different aging stage by comparing unmodified asphalt binder (PG6422, diamonds) to binder comprising 5 weight percentage (%) large particle (less than 150 micron and greater than 75 micron) bio-char produced by a fast pyrolysis (Microwave-reactor) method (ML05, squares) and binder comprising 10 weight ° A. large particle bio-char produced by the fast pyrolysis method (ML10, triangles). FIG. 6 (upper right graph) shows how modifier type affects complex viscosity at different aging stage by comparing unmodified asphalt binder (PG6422, diamonds) to binder comprising 10 weight % small particle (75 micron or less) bio-char produced by the fast pyrolysis method (MS10, squares), binder comprising 10 weight % small particle bio-char produced by a slow pyrolysis (Tube Furnace) method with a highest treatment temperature (HTT) of 500 degrees Celsius (° C.) (T500S10, diamonds), and binder comprising 10 weight % commercially available activated carbon (C10, plain line). FIG. 6 (lower left graph) shows how bio-char particle size affects complex viscosity at different aging stage by comparing unmodified asphalt binder (PG6422, diamonds) to binder comprising 10 weight % small particle bio-char produced by the fast pyrolysis method (MS10, squares), binder comprising 10 weight % large particle bio-char produced by the fast pyrolysis method (ML10, triangles), binder comprising 10 weight % small particle bio-char produced by the slow pyrolysis with a HTT of 500° C. (T500S10, x's), and binder comprising 10 weight % large particle bio-char produced by slow pyrolysis with a HTT of 500° C. (T500L10, >ж's). FIG. 6 (lower right graph) shows the effect of HTT on complex viscosity at different aging stage by comparing unmodified binder (PG6422, diamonds) to binder comprising 10 weight % small particle bio-char produced by slow pyrolysis with a HTT of 400° C. (T400S10, squares) and binder comprising 10 weight % small particle bio-char produced by slow pyrolysis with a HTT of 500° C. (T500S10, triangles).

FIG. 7 (upper left graph) shows the effect of modifier content by comparing unmodified asphalt binder (PG6422, diamonds) to binder comprising 5 weight percentage (%) large particle (less than 150 microns and greater than 75 microns) bio-char produced by fast (Microwave-reactor) pyrolysis (ML05, squares), binder comprising 10 weight % large particle bio-char produced by fast pyrolysis (ML10, triangles), binder comprising 15 weight % large particle bio-char produced by fast pyrolysis (ML15, circles), and binder comprising 20 weight % of large particle bio-char produced by fast pyrolysis (ML20, ж's). FIG. 7 (upper right graph) shows the effect of modifier type by comparing unmodified binder (PG6422, diamonds) to binder comprising 10 weight % small particle (less than 75 micron) bio-char produced by fast pyrolysis (MS10, squares), binder comprising 10 weight % small particle bio-char produced by slow (Tube-Furnace) pyrolysis with a highest treatment temperature (HTT) of 500° C. (T500S10, triangles) and binder comprising 10 weight % commercially available activated carbon (C10, x's). FIG. 7 (lower left graph) shows the effect of particle size by comparing unmodified binder (PG6422, diamonds) to binder comprising 10 weight % small particle bio-char produced by fast pyrolysis (MS10, squares), binder comprising 10 weight % large particle bio-char produced by fast pyrolysis (ML10, triangles), binder comprising 10 weight % small particle bio-char produced by slow pyrolysis with a HTT of 500° C. (T500S10, x's), and binder comprising 10 weight % large particle bio-char produced by slow pyrolysis with a HTT of 500° C. (T500L10, ж's). FIG. 7 (lower right graph) shows the effect of HTT by comparing unmodified binder (PG6422, diamonds) to binder comprising 10 weight % small particle bio-char produced by slow pyrolysis with a HTT of 400° C. (T400S10, squares) and binder comprising 10 weight % small particle bio-char produced by slow pyrolysis with a HTT of 500° C. (T500S10, triangles).

FIG. 8 (upper left graph) shows the effect of modifier content by comparing unmodified asphalt binder (PG6422, diamonds) to binder comprising 5 weight percentage (%) large particle (less than 150 microns and greater than 75 microns) bio-char produced by fast (Microwave-reactor) pyrolysis (ML05, squares), binder comprising 10 weight % large particle bio-char produced by fast pyrolysis (ML10, triangles), binder comprising 15 weight % large particle bio-char produced by fast pyrolysis (ML15, x's), and binder comprising 20 weight % large particle bio-char produced by fast pyrolysis (ML20, ж's). FIG. 8 (upper right graph) shows the effect of modifier type by comparing unmodified binder (PG6422, diamonds) to binder comprising 10 weight % small particle (less than 75 micron) bio-char produced by fast pyrolysis (MS10, squares), binder comprising 10 weight % of small particle bio-char produced by slow (Tube-Furnace) pyrolysis with a highest treatment temperature (HTT) of 500° C. (T500S10, triangles) and binder comprising 10 weight % commercially available activated carbon (C10, x's). FIG. 8 (lower left graph) shows the effect of particle size by comparing unmodified binder (PG6422, diamonds) to binder comprising 10 weight % small particle bio-char produced by fast pyrolysis (MS10, squares), binder comprising 10 weight % large particle bio-char produced by fast pyrolysis (ML10, triangles), binder comprising 10 weight % small particle bio-char produced by slow pyrolysis with a HTT of 500° C. (T500S10, x's), and binder comprising 10 weight % large particle bio-char produced by slow pyrolysis with a HTT of 500° C. (T500L10, ж's). FIG. 8 (lower right graph) shows the effect of HTT by comparing unmodified binder (PG6422, diamonds) to binder comprising 10 weight % small particle bio-char produced by slow pyrolysis with a HTT of 400° C. (T400S10, squares) and binder comprising 10 weight % small particle bio-char produced by slow pyrolysis with a HTT of 500° C. (T500S10, triangles).

FIG. 9 (upper left graph) shows the effect of modifier content by comparing unmodified binder (PG6422) to binder comprising 5, 10, 15, or 20 weight percentage (%) of large particle (less than 150 micron and greater than 75 micron) bio-char produced by fast (Microwave-reactor) pyrolysis (ML05, ML10, ML15, and ML20, respectively). FIG. 9 (upper right graph) shows the effect of modifier type by comparing unmodified binder (PG6422) to binder comprising 10 weight % small particle (less than 75 micron) bio-char produced by fast pyrolysis (MS10), binder comprising 10 weight % small particle bio-char produced by slow (Tube-Furnace) pyrolysis with a highest treatment temperature (HTT) of 500° C. (T500S10), and binder comprising 10 weight % commercially available activated carbon (C10). FIG. 9 (lower left graph) shows the effect of particle size by comparing unmodified binder (PG6422) to binder comprising 10 weight % small particle bio-char produced by fast pyrolysis (MS10), binder comprising 10 weight % large particle bio-char produced by fast pyrolysis (ML10), binder comprising 10 weight % small particle bio-char produced by slow pyrolysis with a HTT of 500° C. (T500S10), and binder comprising 10 weight % large particle bio-char produced by slow pyrolysis with a HTT of 500° C. (T500L10). FIG. 9 (lower right graph) shows the effect of HTT by comparing unmodified binder (PG6422) with binder comprising 10 weight % small particle bio-char produced by slow pyrolysis with a HTT of 400° C. (T400S10) and binder comprising 10 weight % small particle bio-char produced by slow pyrolysis with a HTT of 500° C. (T500S10). The error bars represent ±standard deviation of three measurements.

FIG. 10 (upper left graph) shows the effect of modifier content by comparing unmodified binder (PG6422) to binder comprising 5, 10, 15, or 20 weight percentage (%) of large particle (less than 150 micron and greater than 75 micron) bio-char produced by fast (Microwave-reactor) pyrolysis (ML05, ML10, ML15, and ML20, respectively). FIG. 10 (upper right graph) shows the effect of modifier type by comparing unmodified binder (PG6422) to binder comprising 10 weight % of small particle (less than 75 micron) bio-char produced by fast pyrolysis (MS10), binder comprising 10 weight % of small particle bio-char produced by slow (Tube-furnace) pyrolysis with a highest treatment temperature (HTT) of 500° C. (T500S10), and binder comprising 10 weight % commercially available activated carbon (C10). FIG. 10 (lower left graph) shows the effect of particle size by comparing unmodified binder (PG6422) to binder comprising 10 weight % small particle bio-char produced by fast pyrolysis (MS10), binder comprising 10 weight % large particle bio-char produced by fast pyrolysis (ML10), binder comprising 10 weight % small particle bio-char produced by slow pyrolysis with a HIT of 500° C. (T500S10), and binder comprising 10 weight % large particle bio-char produced by slow pyrolysis with a HTT of 500° C. (T500L10). FIG. 10 (lower right graph) shows the effect of HTT by comparing unmodified binder (PG6422) with binder comprising 10 weight % small particle bio-char produced by slow pyrolysis with a HTT of 400° C. (T400S10) and binder comprising 10 weight % small particle bio-char produced by slow pyrolysis with a HTT of 500° C. (T500S10).

FIG. 11 (top and bottom left) shows SEMs of bio-char produced by slow (Tube-Furnace) pyrolysis with a highest treatment temperature of 400 degrees Celsius (° C.). The scale bar in the SEM on the top left is 50 microns (μm), while that in the SEM on the bottom left is 5 μm. FIG. 11 (upper center, middle center, lower center) shows SEMs of commercially available carbon black. The scale bar in the SEM at the top center, middle center and bottom center are 50, 250 and 5 μm, respectively. FIG. 11 (top and bottom right) shows SEMs of commercially available carbon fiber. The scale bar in the SEM on the top right is 50 μm, while that on the bottom right is 5 μm.

DETAILED DESCRIPTION

Figure 1:
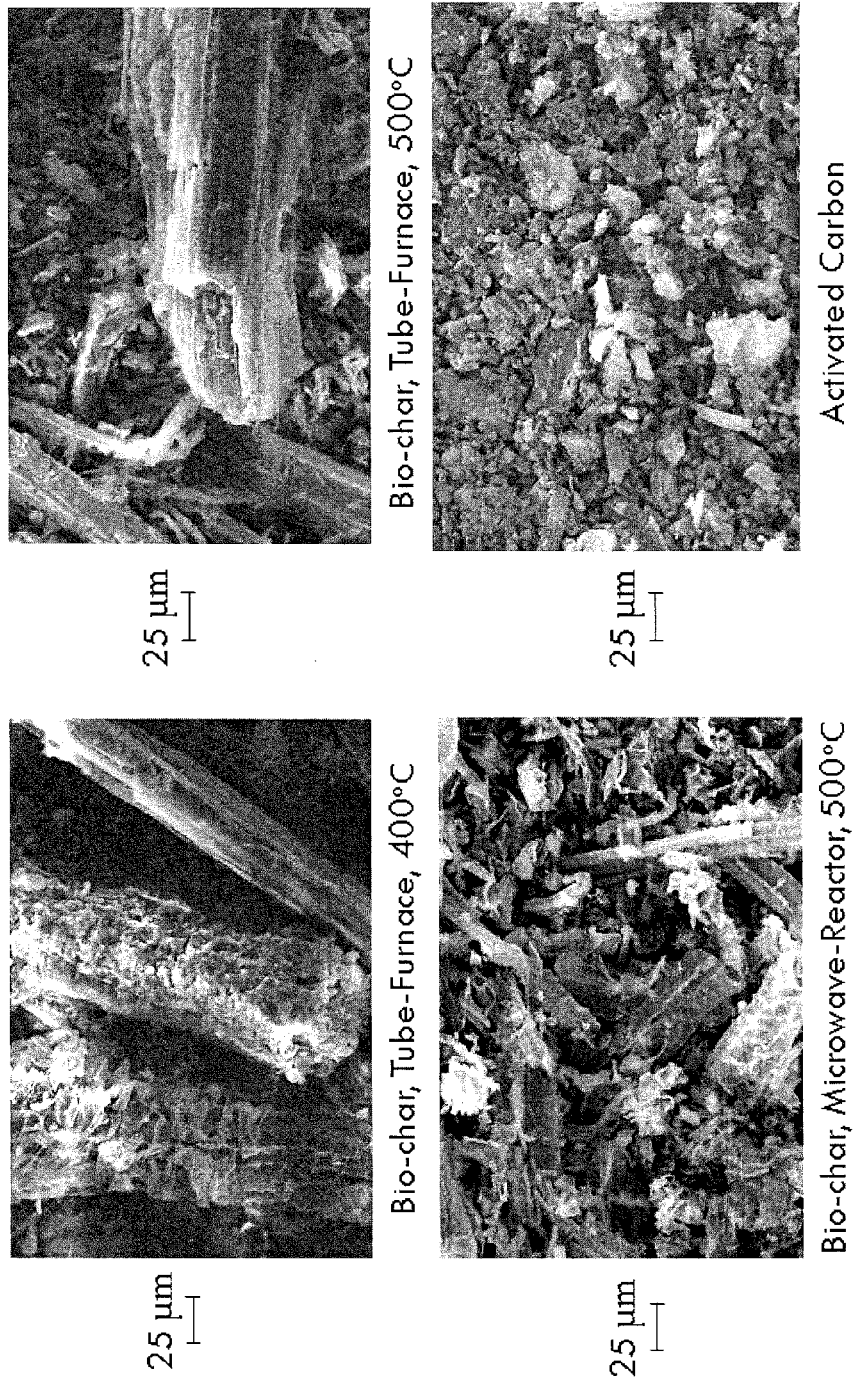
FIG. 1 is a set of scanning electron micrographs (SEM) of different carbon-based asphalt binder additives taken at 1,000 times magnification.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims. Thus, for example, reference to "a compound" includes mixtures of one or more compounds, two or more compounds, and the like.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the presently disclosed subject matter.

The term "about", as used herein when referring to a measurable value such as an amount of weight, molar equivalents, time, temperature, etc. is meant to encompass in one example variations of ±20% or ±10%, in another example ±5%, in another example ±1%, and in yet another example ±0.1% from the specified amount, as such variations are appropriate to perform the disclosed methods.

The term "comprising", which is synonymous with "including," "containing," or "characterized by" is inclusive or open-ended and does not exclude additional, unrecited elements or method steps. "Comprising" is a term of art used in claim language, which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

Biomass includes a variety of plants and plant materials, such as, but not limited to, papermaking sludge, wood and wood-related materials, e.g., saw dust, or particle board, leaves, or trees, such as poplar trees. In some embodiments, biomass is selected from the group including, but not limited to, herbaceous material, agricultural residues, forestry residues, municipal solid wastes, waste paper, pulp and paper mill residues, or a combination thereof. In some embodiments, biomass is a non-wood material. In some embodiments, the biomass is from a biofuel crop (i.e., a crop grown for use in producing a bio-fuel, such as bio-ethanol). In some embodiments, the biomass is a grass, such as but not limited to switchgrass and sudangrass; grass clippings; rice hulls; bagasse (e.g., sugar cane bagasse), jute; hemp; flax; bamboo; miscanthus; sorghum residue; sisal; abaca; hays; straws; corn cobs; corn stover; whole plant corn, and coconut hair.

As used herein the term "asphalt" can refer to a petroleum residue that can be a viscous liquid or semi-solid. Asphalt can comprise aliphatic, aromatic and naphthenic hydrocarbons with high molecular weight and small quantities of organic acids, bases and heterocyclic components containing nitrogen and sulfur. The terms "asphalt binder", "bitumen", and "asphalt cement" can be used interchangeably with "asphalt".

The terms "asphalt concrete" and "asphalt mixture" as used herein refer to mixtures of asphalt and mineral-based aggregates, e.g., rock, sand, gravel, slag, crushed stone, etc.

The term "bio-char" as used herein refers to the remaining organic material after a biomass has been subjected to a thermal treatment process, such a thermal treatment process that lead to carbonization. In some embodiments, bio-char refers to pyrolyzed biomass. In some embodiments, bio-char refers to pyrolyzed biomass from a non-wood biomass material. In some embodiments, the bio-char is derived from a biomass material that is from a crop grown for the purpose of producing a biofuel. Thus, the presently disclosed bio-char can be a co-product of a bio-fuel production method.

The term "bio-modifier composition" as used herein can refer to a composition that comprises material derived from biomass (e.g., bio-char) that is for use as an additive in an asphalt composition (e.g., in an asphalt binder or asphalt concrete). In some embodiments, the bio-modifier composition can change the rheological and/or performance properties of the asphalt composition.

II. General Considerations

Much recent effort has been made in developing methods and systems for generating energy and fuel from renewable organic materials rather than fossil fuels. For example, there is interest in processes for converting cellulosic bio-mass (e.g., from corn, wheat, sugar cane and sugar beets) into fuels, such as ethanol, propanol and butanol. Co-products of these processes which are not suitable for bio-fuel production are also drawing much attention. Efforts have been made to look for practical applications for bio-char, a carbonaceous co-product from converting plant matters to bio-fuels through pyrolysis.

In some embodiments, the presently disclosed subject matter provides a method for preparing a bio-modifier composition for asphalt. In some embodiments, the method comprises providing a biomass material and treating the biomass material under conditions suitable to produce a bio-modifier composition comprising bio-char.

In some embodiments, the biomass material is non-wood biomass (e.g., the biomass material can comprise materials including, but not limited to, grasses, such as switchgrass and sudangrass; grass clippings; agricultural residues; rice hulls; bagasse (e.g., sugar cane bagasse), jute; hemp; flax; bamboo; sisal; abaca; hays; straws; miscanthus; sorghum residue; corn cobs; corn stover; whole plant corn, and/or coconut hair). In some embodiments, the non-wood biomass is material from a crop that was grown for use in the production of a biofuel. In some embodiments, the non-wood biomass is a grass. In some embodiments, the grass is switchgrass.

In some embodiments, providing the biomass material can further include pre-treating the biomass. Any suitable pretreatment can be used, such as, but not limited to, washing the biomass (e.g., to remove soil residue), drying the biomass, crushing the biomass, chopping the biomass and/or otherwise reducing the biomass material in size. In some embodiments, biomass material can be ground in a rotational grinder. In some embodiments, the biomass can be ground to powder size (e.g., less than 0.15 mm).

Treating the biomass can involve pyrolysis (e.g., to provide bio-char particles). In some embodiments, treating the biomass material can comprise pyrolysis that is performed under a nitrogen (or other inert gas) atmosphere and/or that is performed under atmospheric pressure. In some embodiments, the biomass can be heated in a microwave or in a tube furnace at atmospheric pressure. When the biomass is heated in a microwave, the biomass can be pre-blended with particles that can absorb the microwaves, such as, but not limited to silicon carbide particles. These particles can be removed from the bio-char following pyrolysis.

In some embodiments, the rate of heating during pyrolysis can be controlled so that the biomass is heated at a desired and/or suitable rate. In some embodiments, the rate of heating can be about 500° C. per minute. In some embodiments, the rate of heating is lower, e.g., about 100, 50, 45, 40, 35, 30, 25, 20, 15, 10, or about 5° C. per minute. In some embodiments, the pyrolysis is performed by increasing temperature from room temperature to a selected highest treatment temperature (HTT) with a heating rate of about 15° C. per minute. The total pyrolysis time can vary, e.g., depending upon the heating rate, type or amount of biomass, etc., and can be determined based on completion of the pyrolysis reaction.

Any suitable HTT can be selected for the pyrolysis. In some embodiments, the HTT is between about 500° C. and about 400° C. In some embodiments, the HTT is about 500° C. In some embodiments, the HTT is about 400° C.

In some embodiments, the presently disclosed methods provide bio-char having an average particle size of about 150 µm or less. In some embodiments, the bio-char has an average particle size that is less than about 150 µm and greater than about 75 µm. In some embodiments, the bio-char has an average particle size of about 75 µm or less.

In some embodiments, the presently disclosed subject matter provides a bio-modifier composition (e.g., for use in modifying an asphalt composition) wherein the bio-modifier composition is prepared by providing a biomass material and treating the biomass material under suitable conditions to provide a bio-modifier composition comprising bio-char. In some embodiments, the biomass material is a non-wood biomass material. As described further hereinbelow, it was found that bio-char produced according to the presently disclosed subject matter was capable of reducing the temperature susceptibility and increasing the rutting resistance of asphalt binder to which it was added. The addition of the bio-char showed lesser effect on the fatigue and cracking resistance, with the best fatigue and cracking resistance found using the bio-char with finer particles produced at lower HTT and lower heating rate. Based on the testing results, bio-char appears to be a more effective binder modifier than commercially activated carbon.

Accordingly, in some embodiments, the presently disclosed subject matter provides a bio-modifier composition for asphalt wherein the bio-modifier composition comprises bio-char. In some embodiments, the bio-char is derived from a non-wood biomass as a starting material. In some embodiments, the bio-char comprises pyrolyzed non-wood biomass, such as but not limited to pyrolyzed grass, such as but not limited to pyrolyzed switchgrass.

In some embodiments, the bio-char has an average particle size of about 150 µm or less. In some embodiments, the bio-char has an average particle size that is less than about 150 µm and greater than about 75 µm. In some embodiments, the bio-char has an average particle size of about 75 µm or less. In general, the bio-char in the presently disclosed bio-modifier compositions can have a porous and/or rough surface texture.

In some embodiments, presently disclosed subject matter provides a method of preparing a modified asphalt composition, wherein the method comprises combining a bio-modifier composition of the presently disclosed subject matter with an asphalt composition (e.g., with an asphalt binder or with a mixture of asphalt binder and aggregate). In some embodiments, the method can comprise drying the bio-modifier composition and the asphalt composition (and/or its components) separately in an oven and then blending the bio-modifier and the asphalt composition or asphalt composition components at a desired ratio, such as but not limited to a desired weight ratio. In some embodiments, the combining comprises mixing an asphalt composition (e.g., an asphalt binder) with a bio-modifier composition to provide a modified asphalt composition comprising about 20 weight % or less of the bio-modifier composition. In some embodiments, the modified asphalt composition comprises about 10 weight % or less (e.g., between about 10 and about 1 weight %) of the bio-modifier composition. In some embodiments, the modified asphalt composition comprises about 10% or about 5 weight % of the bio-modifier.

In some embodiments, the presently disclosed subject matter provides a modified asphalt composition produced by combining a bio-modifier composition of the presently disclosed subject matter with an asphalt composition (e.g., with an asphalt binder or an asphalt concrete).

In some embodiments, the presently disclosed subject matter provides a modified asphalt composition comprising a bio-modifier composition comprising bio-char. In some embodiments, the bio-modifier composition comprises pyrolytic bio-char, such as but not limited to pyrolytic non-wood bio-char. The modified asphalt composition can further comprise asphalt binder or asphalt binder and aggregate. Thus, in some embodiments, the modified asphalt composition is a modified asphalt binder or a modified asphalt concrete. In some embodiments, the modified asphalt composition comprises a modified asphalt binder comprising about 20 weight % or less of the bio-modifier. In some embodiments, the modified asphalt binder comprises about 10 weight % or less (e.g., between about 10 and about 1 weight %) of the bio-modifier composition. In some embodiments, the modified asphalt binder comprises about 10% or about 5 weight % of the bio-modifier.

EXAMPLES

The following Examples have been included to illustrate modes of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Bio-Char Production

Bio-char was produced by pyrolysis of switchgrass (14 wt. % moisture). More particularly, pre-processed switchgrass was ground to powder size (less than 0.15 mm) prior to pyrolytic processing via a Tube-Furnace method (also referred to as "slow pyrolysis") or a Microwave-Reactor method (also referred to as "fast pyrolysis").

For the Tube-Furnace method, pyrolytic temperature was increased from room temperature to target temperature (400° C. or 500° C.) with a heating rate of 15° C./min and then maintained constant until a total reaction time of 90 minutes was reached. Nitrogen gas with a flow rate of 1.5 milliliters per second (ml/s) was used to purge the air and expel gas and fluid generated from the reaction chamber. After the reaction, the solid residue was collected. The bio-char yield was 28 weight % at a residence temperature of 400° C. and 25 weight % at 500° C., respectively.

For the Microwave-Reactor method, switchgrass powder was pre-blended with fine silicon carbide particles at a ratio of 1:3 by weight to absorb sufficient microwave. Nitrogen gas was used to purge air from the microwave chamber prior to the reaction. The mixture was heated to 500° C. in less than 1 minute and maintained at the same temperature level for 15 minutes. After the reaction, the mixture was cooled down to ambient temperature and the silicon carbide particles were sieved out using a No. 100 sieve. The bio-char yield rate from this "fast" pyrolysis was 21 wt. %.

Example 2

Asphalt Binder Preparation

The bio-chars prepared above were mixed with asphalt binder. A performance graded asphalt binder, i.e., a PG 64-22 binder, was used. The first number in the binder grading, i.e. 64, indicates a highest pavement temperature of 64° C., while the second number, i.e., −22, indicates a lowest pavement temperature of −22° C. In addition, for comparison with the bio-char samples, a commercially available activated carbon was used as a reference additive. The commercially available activated carbon had a high surface area (i.e., 900 $m^2/g$) to potentially enhance the interaction between the binder and the carbon.

Figure 2:
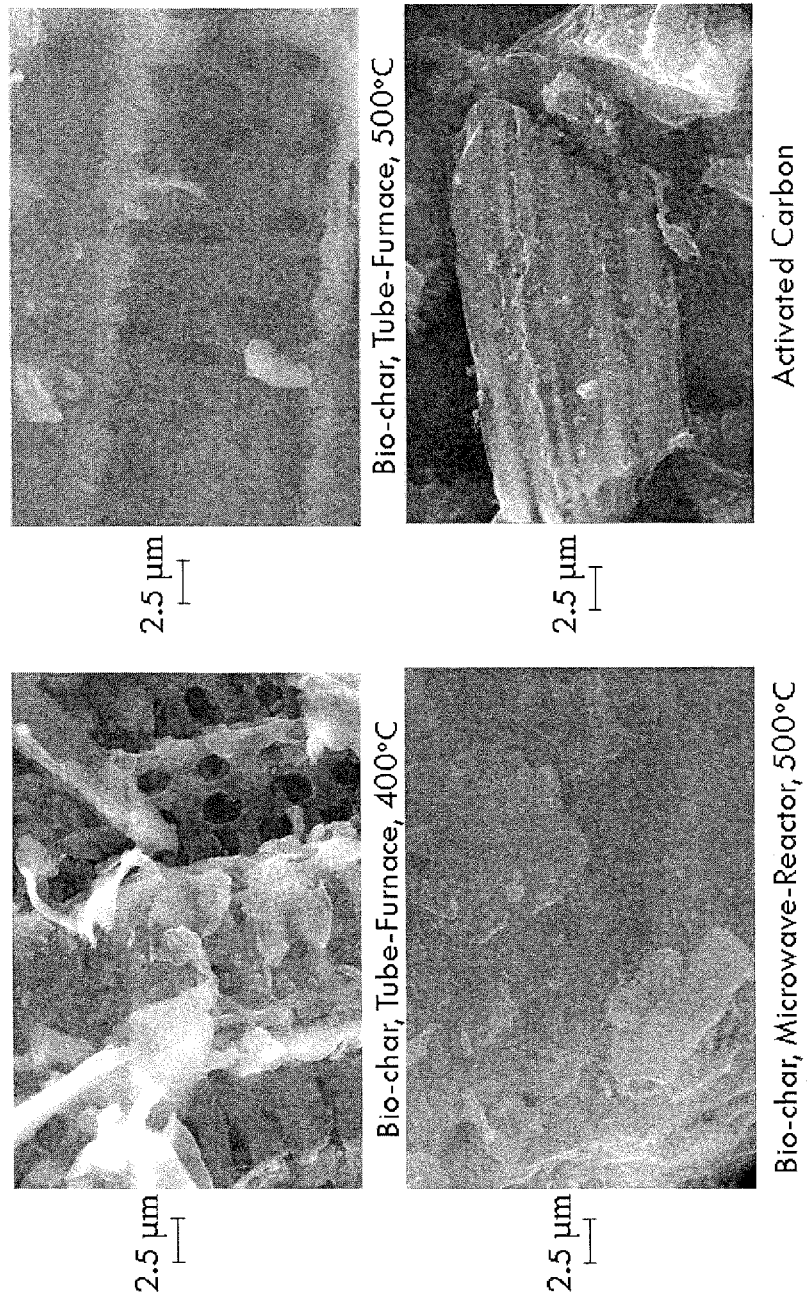
FIG. 2 is a set of scanning electron micrographs (SEM) of the different carbon-based asphalt binder additives as described for FIG. 1 taken at 10,000 times magnification.

FIGS. 1 and 2 show the scanning electron microscope (SEM) images of different modifiers with 1000 and 10000 times magnification, respectively. The bio-char appears comprised of irregular fiber-shaped particles with a porous structure. The bio-char produced with a lower highest treatment temperature and a lower heating rate (e.g., bio-char prepared via the slow or Tube-Furnace method) seems to have the most complex surface texture. Without being bound to any one theory, it is believed that the porous and fibrous structure of the bio-char can help build a strong modifier-asphalt binder matrix that can improve the properties and performance of the modified binder. As seen again in FIG. 1 (bottom right) and FIG. 2 (bottom right), the commercially available activated carbon is composed of very fine particles, indicating high surface areas. It is believed that the solid particle-shaped activated carbon can behave merely like micro-particles added into the binder.

The asphalt binder was heated in an oven at 165° C. while the carbon-based additives (i.e., the bio-char or the activated carbon) were dried at 120° C. for two hours. Then the additives were blended into the binder at target concentrations (i.e., 5, 10, 15, or 20 weight %) using a mixing device designed for mastic research. See Huang, B., et al., *International Journal of Pavement Engineering*, 2007, 8(1): 1-9. Samples were collected immediately after the blending and stored in small metallic containers at −10° C.

Table 1 below summarizes the different asphalt binder samples prepared. In the "Sample ID", "M" indicates Microwave-Reactor method; "T" indicates Tube-Furnace method; "L indicates large particle size; "S" indicates small particle size; "C" indicates commercially activated carbon; the numbers "05", "10", "15", and "20" indicate additive concentration (i.e., the weight % of modifier in the modified binder); the numbers "400" and "500" indicate highest treatment temperature (HTT), and PG6422 indicates unmodified binder.

TABLE 1

Asphalt Binder Samples.

| Sample ID | Modifier Type | Heating Rate (° C./min) | Highest Treatment Temperature (HTT) (° C.) | Particle Size | Modifier Content (wt. %) |
|---|---|---|---|---|---|
| PG6422 | N/A | N/A | N/A | N/A | N/A |
| ML05 | Microwave Reactor Biochar | 400~500 | 500 | 150 > d > 75 μm | 5 |
| ML10 | | | | | 10 |
| ML15 | | | | | 15 |
| ML20 | | | | | 20 |
| MS10 | | | | d < 75 μm | 10 |
| T400S10 | Tube Furnace Biochar | 15 | 400 | d < 75 μm | 10 |
| T500S10 | | | 500 | | 10 |
| T500L10 | | | 500 | 150 > d > 75 μm | 10 |
| C10 | Commercial Activated Carbon | N/A | N/A | d < 75 μm | 10 |

Example 3

Rheological Properties

It has been long established that the rheological properties of the bitumen used affect pavement performance. See Brown, E. R., et al., "Hot Mix Asphalt Materials, Mixture Design, and Construction", Third Edition, NAPA Research and Education Foundation, 2009. As bitumens can be considered as viscoelastic materials, dynamic mechanical properties such as complex shear modulus (G*) and phase angle (δ) are considered the most crucial rheological indicators of bituminous binder. G* is a measure of the total resistance of the bitumen to deformation when repeatedly sheared, while δ is the lag between the applied shear stress and the resulting shear strain. See Fini, E. H., et al., *Journal of Materials in Civil Engineering*, 2011, 23: 1506-1508. Complex viscosity (η*) can be derived from complex shear modulus by the following equation: |η*|=|G*|/ω, where ω is the angular frequency.

The results of G* at different temperatures can be horizontally shifted to a single continuous master curve at one temperature for asphalt binders that are highly temperature-dependent. This phenomenon is called time-temperature superposition. The master curve at a given temperature can be used as a reference to predict curves at various temperatures by applying a shift operation, especially for some extreme frequency zones that are technically interesting but experimentally out of reach.

G*, δ and η* of all the samples were measured at −10° C., 5° C., 20° C. and 35° C. using a dynamic shear rheometer (DSR) according to ASTM D7175 (ASTM 2008b), and a Detailed factor analysis was conducted in terms of directly measured complex viscosity of all the samples at different service temperature ranges.

As previously stated, η* was directly measured under different service temperatures (low, medium and high) at an angular frequency of 10 rad/s that simulates the shearing action corresponding to a traffic speed of about 55 mph (90 km/hr). The results are reported in Table 2, below. The effects of the bio-modifiers under extreme service temperatures of interest (high and low) on the asphalt binder are discussed respectively below.

TABLE 2

Complex viscosity (η*) at different service temperatures[a].

| T (° C.) | −10 | 0 | 10 | 20 | 25 | 58 | 64 | 70 | 76 |
|---|---|---|---|---|---|---|---|---|---|
| PG6422 | 20396825 (6) | 12690175 (1) | 3016633 (2) | 532428 (2) | 206327 (6) | 646 (8) | 273 (19) | 130 (20) | 72 (21) |
| ML05 | 20953900 (4) | 12711650 (2) | 3758590 (1) | 713105 (3) | 281787 (0) | 938 (3) | 378 (4) | 174 (5) | 119 (23) |
| ML10 | 22734500 (5) | 14149050 (2) | 4477865 (2) | 899682 (2) | 370951 (3) | 1428 (5) | 642 (12) | 304 (17) | 184 (18) |
| ML15 | 26832750 (4) | 17833150 (13) | 6049825 (15) | 1295915 (14) | 523401 (13) | 1969 (16) | 833 (17) | 393 (16) | 234 (17) |
| ML20 | 27078850 (7) | 17501400 (6) | 6017320 (9) | 1310590 (11) | 548488 (12) | 2082 (14) | 950 (10) | 491 (12) | 269 (15) |
| MS10 | 20958150 (4) | 13720650 (7) | 4237140 (8) | 814967 (8) | 328438 (8) | 1367 (11) | 569 (15) | 242 (17) | 142 (19) |
| T400S10 | 26341825 (0) | 13302525 (11) | 4047293 (13) | 801736 (14) | 312045 (13) | 1155 (16) | 504 (18) | 244 (23) | 140 (16) |
| T500S10 | 26384600 (8) | 14281675 (15) | 4496033 (16) | 898291 (14) | 355327 (12) | 1367 (16) | 580 (17) | 251 (10) | 136 (17) |
| T500L10 | 20740400 (4) | 13461250 (3) | 4518150 (6) | 986769 (11) | 398714 (10) | 1539 (12) | 669 (3) | 305 (3) | 180 (11) |
| C10 | 32145500 (11) | 16759325 (9) | 5115078 (12) | 988673 (12) | 384031 (13) | 1180 (16) | 470 (16) | 211 (21) | 114 (23) |

[a]All samples were average values calculated from N = 3 replicate measurements, with coefficient of variation in parentheses.

master curve at 25° C. was created for each sample. To relate the rheological properties to the binder performance at service, all the samples were subject to DSR at an angular frequency of 10 radians per second (rad/s) in order to obtain the complex viscosity of the samples at given service temperatures: −10° C., 0° C., 10° C. (low temperature in service), 20° C., 25° C. (medium temperature in service), 58° C., 64° C., 70° C. and 76° C. (high temperature in service). The angular frequency of 10 rad/s was selected to simulate the shearing action corresponding to a traffic speed of about 55 miles per hour (mph, i.e., 90 kilometers per hour (km/hr)). See Brown, E. R., et al., "Hot Mix Asphalt Materials, Mixture Design, and Construction", Third Edition, NAPA Research and Education Foundation, 2009.

Since the rheological properties of asphalt cements change during hot mix asphalt (HMA) production and continue to change subsequently in service, samples were submitted to two different laboratory aging processes: rolling thin film oven (RTFO) (American Association of State Highway Transportation Officials (AASHO) Designation T240) for simulating binder aging during the manufacture and construction of HMA (i.e., short term aging) and pressure aging vessel (PAV) (ASTM D454) for simulating aging that occurs during 5-10 years of in-service HMA pavements (i.e., long term aging). The aged samples together with unaged virgin samples were subject to DSR at 10 rad/s under 25° C. for the analysis of the combined effects of aging and bio-modifier addition on asphalt binder.

Figure 3:
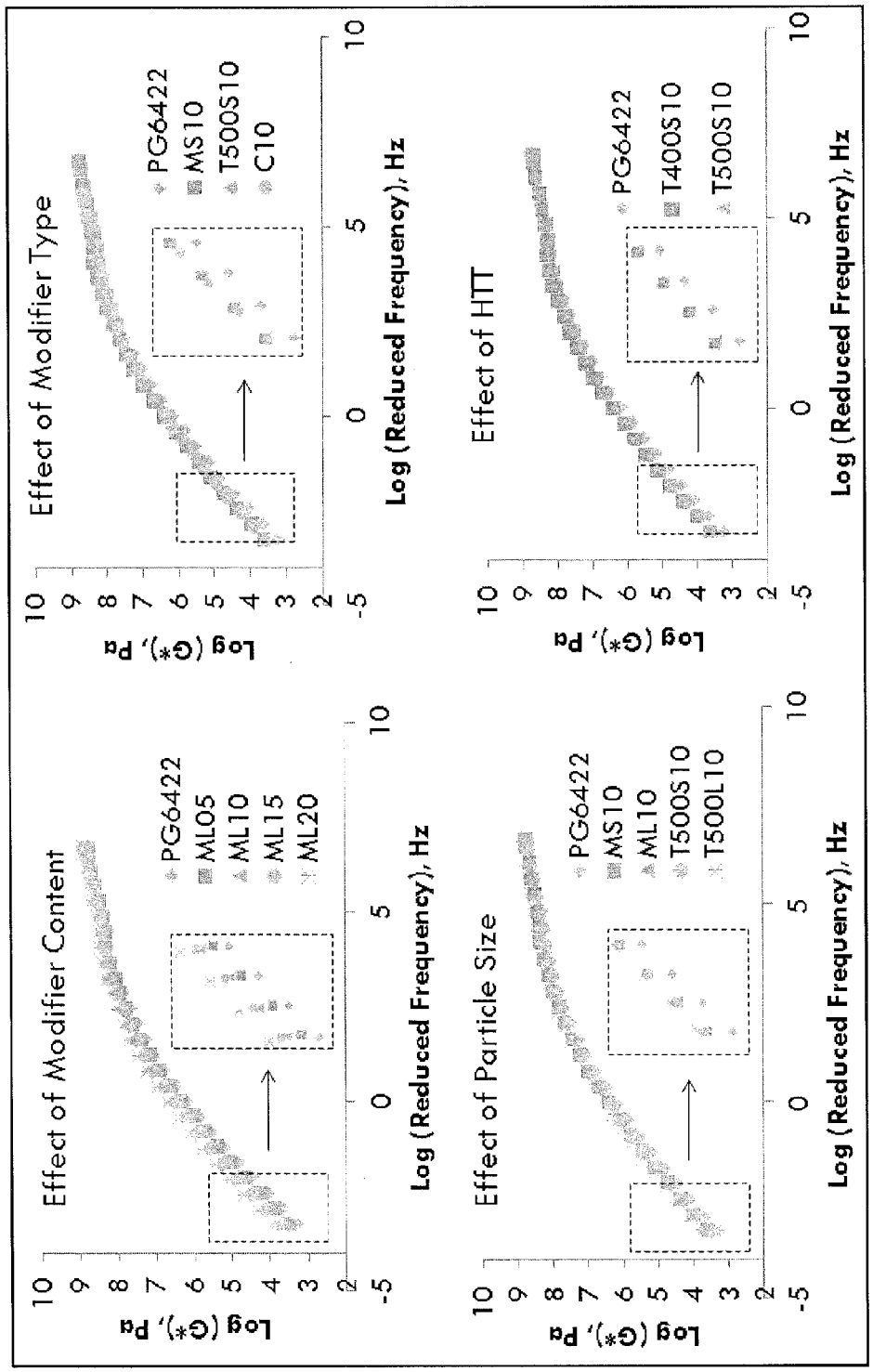
FIG. 3 is a set of graphs showing the complex modulus (G*) master curves (log G* (pascals (Pa)) versus log reduced frequency (Hertz (Hz)) at 25 degrees Celsius (° C.) for various asphalt binder compositions.

FIG. 3 shows the G* master curves for the modified binders as well as for unmodified base binder. It can be seen that the carbonaceous additives increase the complex modulus of the binder at low frequencies (high temperatures) while not making noticeable change at high frequencies (low temperatures), indicating that the carbonaceous materials can have the capability of reducing the temperature susceptibility of the paving asphalt binder. Among the evaluated variables, modifier content appears to be a significant factor.

Figure 4:
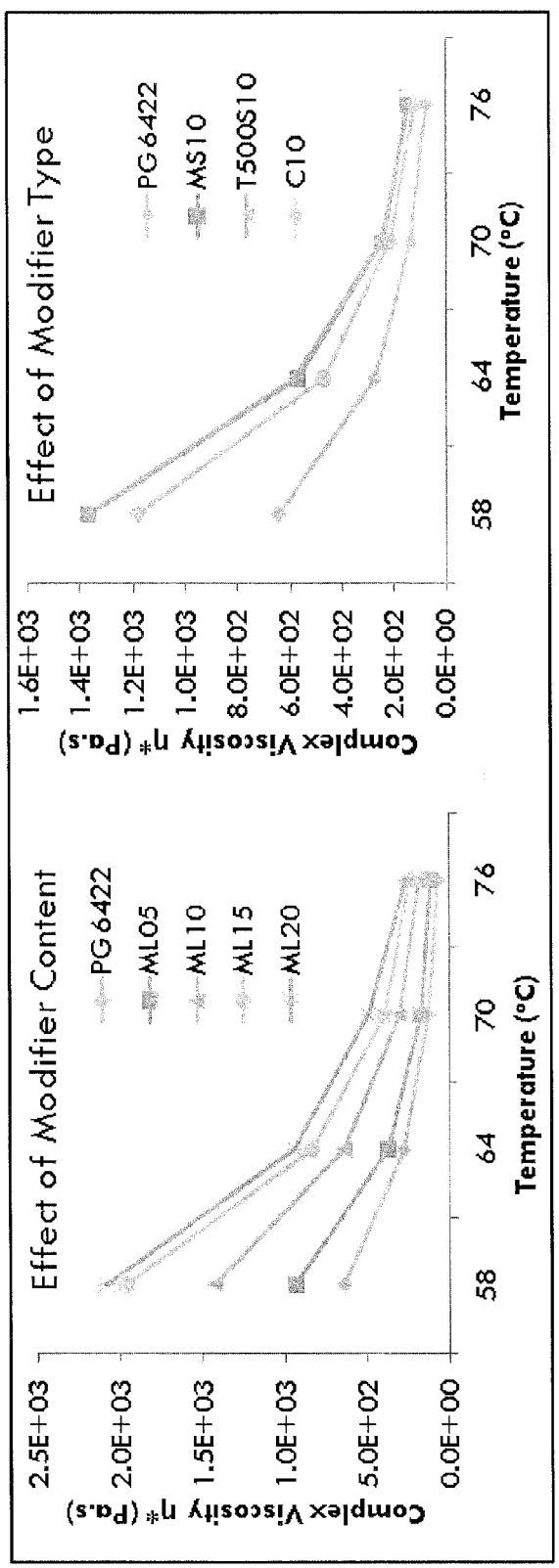
FIG. 4 shows a pair of graphs of the complex viscosity analyses (complex viscosity, η* (pascals (Pa) per second (s)), versus temperature) of various asphalt binder compositions at high service temperatures (i.e., 58, 64, 70, and 76 degrees Celsius (° C.)).

More pronounced effects due to modifier addition were observed at high service temperatures. As can be seen in Table 2, the viscosity of modified binders was increased under selected high service temperatures, which can result in a higher rutting resistance. Without being bound to any one theory, it is believed that this can be attributed to the volume-filling and physiochemical reinforcement of the particles added into the binder. At high service temperatures, asphalt binder tends to be viscous and facilitates the interaction between the binder and added solid additives. Modifier content and modifier type seem to affect the binder's viscosity in a noticeable level, which is shown in FIG. 4. As the modifier content goes higher, the stiffening effect grows more significant. Again without being bound to any one theory, it is believed that this can be explained by the further development of the particle interaction reinforcement, as the rigid modifier particles increase to a certain amount and come into contact, consequently forming a skeletal framework. The bio-char expressed better stiffening improvement than activated carbon, possibly due to its porous and fibrous structure, which could help build a stronger modifier-asphalt binder matrix.

As shown in Table 2, the addition of most modifiers has little effect on viscosity of the asphalt binder at low service temperatures, indicating that the incorporation of bio-modifiers could reduce binder brittleness, which in turn can reduce the possibility of the low temperature cracking. At low service temperatures, asphalt binders tend to be solid and elastic, which could compromise the volume-filling stiffening of the rigid functional group. Thus, it is possible that the properties of the blended mastic at lower temperatures could be dominated by the asphalt skeleton at low levels of additives (e.g. less than 10%). This could account for the observation that particle size, highest treatment temperature (HTT) and pyrolysis type showed relatively little effect on the viscosity at low temperatures. In addition, the potential chemical interaction between bio-char and a certain amount of asphaltenes could decrease the asphaltene concentration in the blend, which might compromise viscosity stiffening to a certain extent at low service temperatures.

Figure 5:
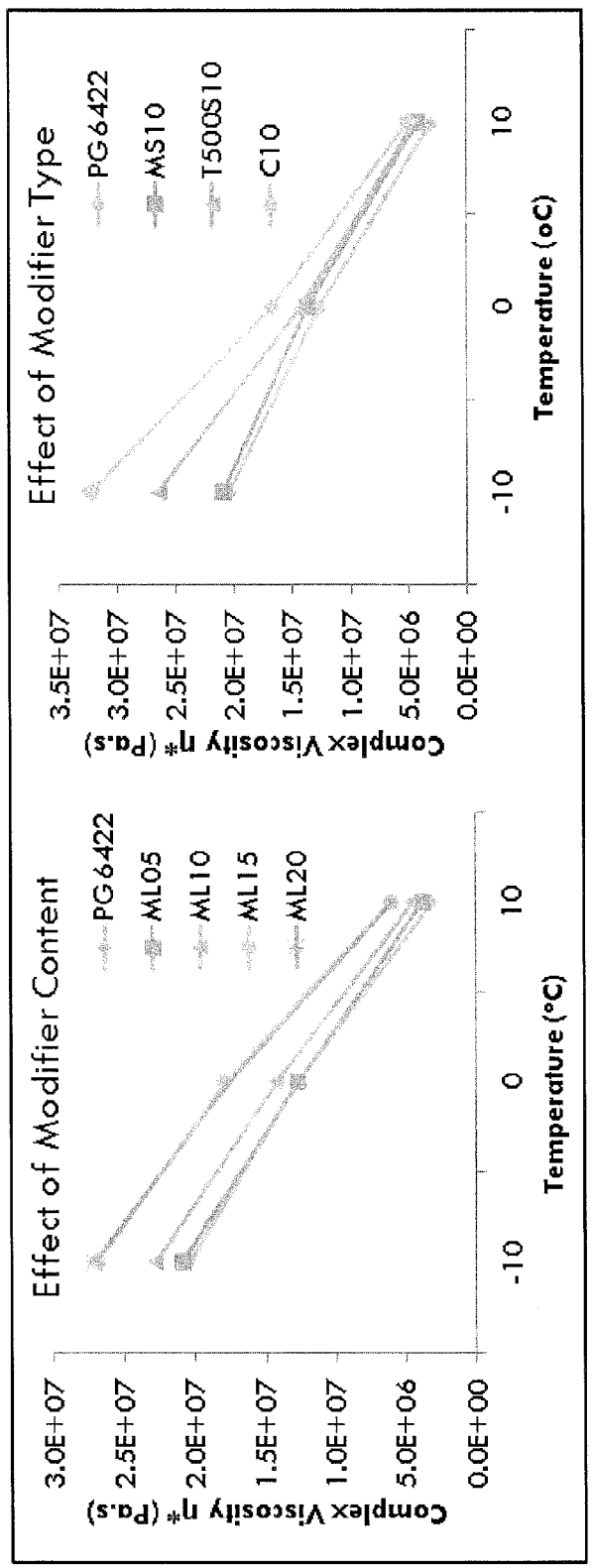
FIG. 5 shows a pair of graphs of the complex viscosity analyses (complex viscosity, η* (pascals (Pa) per second (s)), versus temperature) of various asphalt binder compositions at low service temperatures (i.e., −10, 0, and 10 degrees Celsius (° C.)).

The modifier content and modifier type appear to behave differently than other factors, as seen in FIG. 5. The effect of microwave-produced bio-char seems negligible at low additive levels (5% and 10%) while becoming significant as additive level is elevated. The apparent stiffening effect of high modifier content at low service temperatures could increase the possibility of thermal cracking of the modified binder. Asphalt binder modified by activated carbon expressed a higher viscosity at low service temperatures than bio-char modified binder. This could also be explained by different physical and chemical interactions between binder and the two types of carbon additives.

Figure 6:
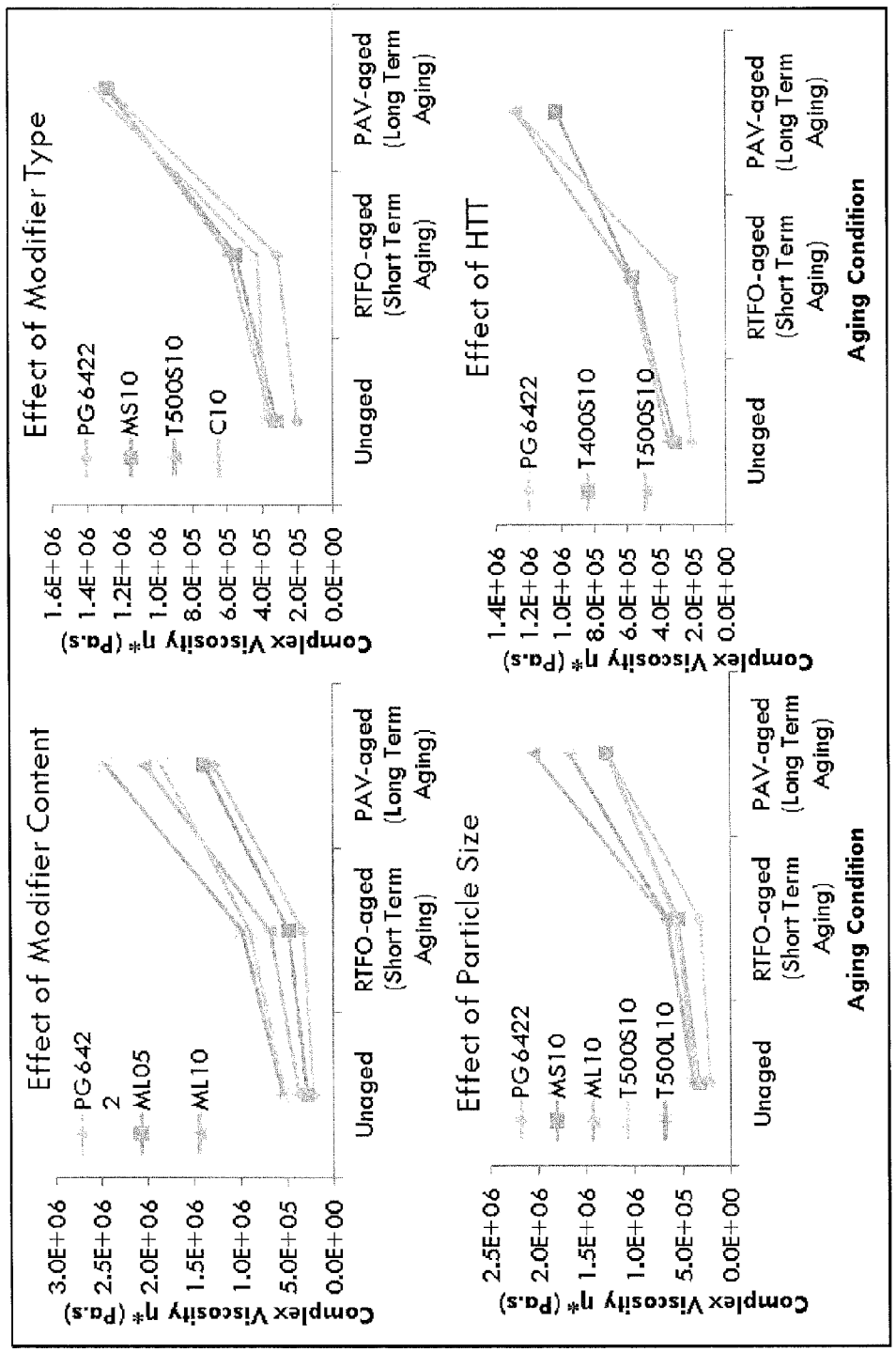
FIG. 6 is a set of graphs showing the effects of aging (unaged, rolling thin film oven (RTFO)-aged, i.e. short-term aging), and pressure aging vessel (PAV)-aged, i.e., long-term aging) on the complex viscosity, η* (Pascals (Pa) per second (s)) of various asphalt binder compositions.

Complex viscosity ($\eta^*$) of all the samples measured at 25° C. after short term aging (RTFO aging) and long term aging (PAV aging) were reported in FIG. 6 in order to analyze the effect of aging on bio-char modified asphalt. The addition of all the additives increased the viscosity of the asphalt binder to a certain degree before aging and after short term aging. The reinforcement can lead to a better resistance to rutting that is the major concern at the early stage of binder service.

As seen in FIG. 6, the stiffening effect of the modifiers after long term aging was not as significant as it was on binders at the early service stage, with some samples even expressing lower viscosity then virgin binder. This observation is of interest as it demonstrates that the presently disclosed bio-modifiers could have the capability of offsetting the effect of aging on asphalt binders. Without being bound to any one theory, this phenomenon could be attributed to a physiochemical interaction between the bio-modifiers and the binder that hinders the lower molecular weight components from oxidation.

It can also be seen in FIG. 6 that the stiffening effect stayed dominant on binders modified by a high amount of bio-char additive (more than 10 weight %) indicating that the amount of the modifier should be limited. Finer particles appeared to serve as more effective modifiers in reducing oxidation due to the high surface areas that promoted the physiochemical reaction during the aging. High HTT could produce less effective bio-modifiers by providing a more recalcitrant and inactive structure, leading to less interaction between bio-char and asphalt binder molecules. Pyrolysis type and modifier type showed little effect after long term aging.

Example 4

Binder Performance

The SUPERPAVE™ (Superior Performing Asphalt Pavements) mix design system and the PG (performance grade) asphalt binder grading system (see McGinnis, R. B., et al., "Background of SUPERPAVE asphalt binder test methods," FHWA, Report No. FHWA-SA-94-069, 1994; and Warren, R. S., et al. "SUPERPAVE asphalt binder test methods—an illustrated overview," FHWA, Report No. FHWA-SA-94-068, 1994) have been almost entirely adopted in the United States and in many other countries since they were developed in the mid-1990s. See Brown, E. R., et al., "Hot mix asphalt materials, mixture design, and construction," Third Edition, NAPA Research and Education Foundation, 2009. Unlike the traditional penetration and viscosity grading system, the PG grading system relates the laboratory testing results with the binder performance in service. Two major pavement distresses correlated with binder performance include rutting and fatigue cracking. Binder employed in road service should hold sufficient resistance to the listed distresses before it can be put into practical use.

Rutting Resistance:

For rutting resistance, a high complex modulus G* value and low phase angle δ are both desirable. See Bahia, H. U., et al., "The SHRP binder rheological parameters: Why are they required and how do they compare to conventional properties," Transportation Research Board, Preprint Paper NO. 950793, 1995. A higher G* value makes a stiffer binder, thus leading to higher rutting resistance, while a lower δ value indicates a more elastic asphalt binder. G*/sin(δ) is used as the rutting performance index in the SUPERPAVE™ asphalt binder specification. The value of 1 kPa of G*/sin(δ) for unaged binder and 2.2 kPa for RTFO aged (short term aging) binder was set as the minimum limit under specified high service temperature. G* and δ of unaged binders and RTFO-aged binders were measured in accordance with ASTM D7175 (ASTM 2008b) by DSR using 10 rad/s at 58° C., 64° C., 70° C. and 76° C.

Fatigue Cracking Resistance:

It is less likely for fatigue cracking to occur if the lower amount of energy is dissipated per cycle. A lower G* gives a less stiff binder and thus leads to the capability of deforming without building up large stresses. In addition, binders with low δ values are more elastic and thus able to reinstate their original condition without dissipating work. See Brown, E. R., et al., "Hot mix asphalt materials, mixture design, and construction," Third Edition, NAPA Research and Education Foundation, 2009. G*sin(δ) was, therefore, chosen to limit the total amount of energy dissipated in service. Since the cracking caused by fatigue mostly occurs after several years' service, the SUPERPAVE™ program specifies 5000 kPa as the maximum criterion for both RTFO-aged (short term aging) and PAV-aged (long term aging) binder in terms of fatigue cracking. In the presently disclosed studies, G* and δ of RTFO-PAV-aged binders were measured in accordance with ASTM D7175 (ASTM 2008b) by DSR using 10 rad/s at 25° C. (ambient temperature).

The rutting index for un-aged and short term-aged samples and the fatigue index and ductility index for short and long term-aged samples were measured to evaluate the rutting, fatigue, and cracking resistance of the presently disclosed modified binders.

Figure 7:
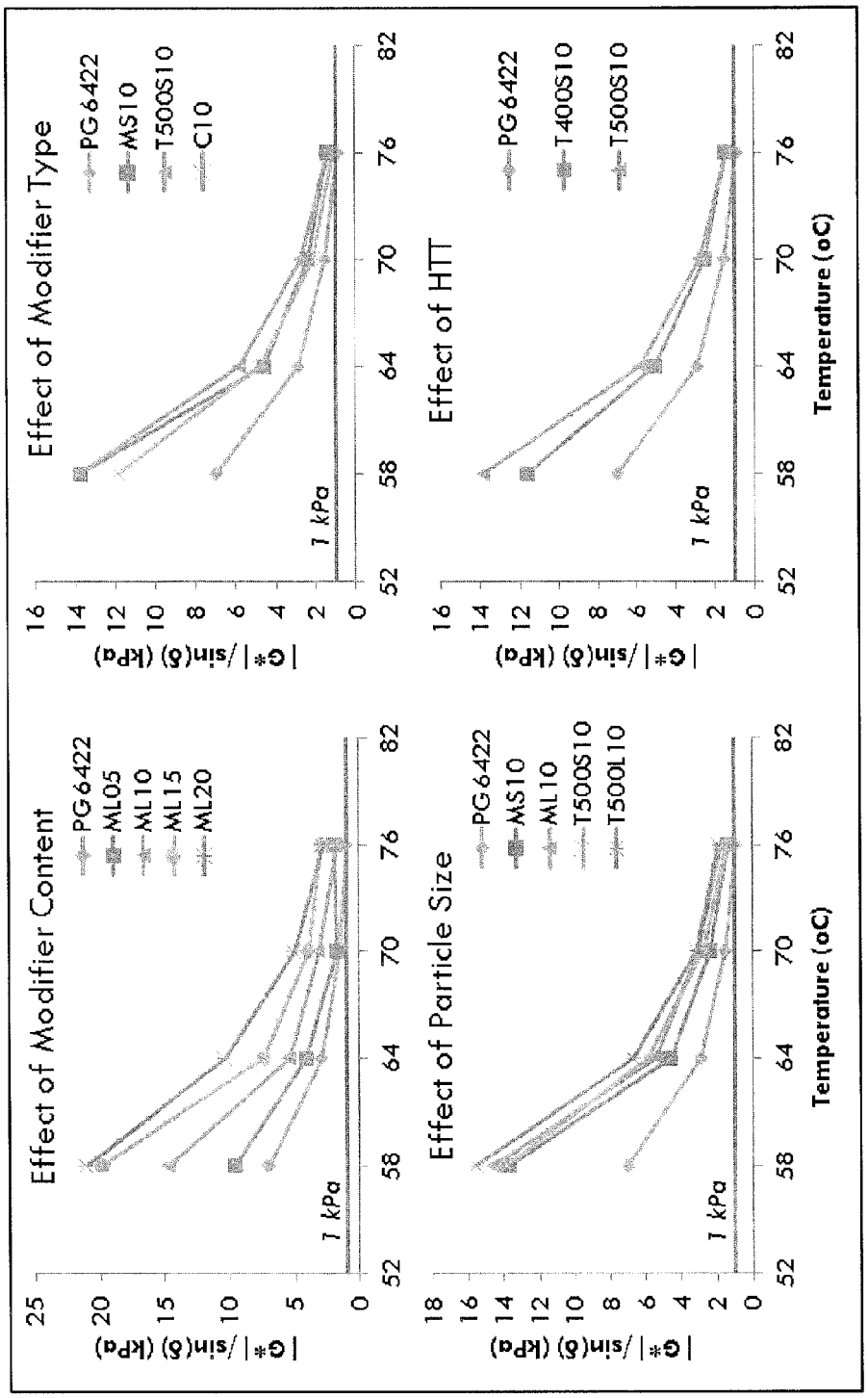
FIG. 7 is a set of graphs showing rutting index (G*/sin(δ)) (kilopascals, kPa)) of un-aged binder samples at high service temperatures (58, 64, 70, or 76 degrees Celsius (° C.)). A value of 1 kPa (straight, unmarked line) was set by SUPERPAVE™ criteria as the minimum limit.

FIG. 7 illustrates the results of rutting index (G*/sin(δ)) for un-aged binders at high service temperatures. The value of 1 kPa was set by SUPERPAVE™ criteria as the minimum limit at the designed high service temperature (64° C.). It is clear that all the samples including the unmodified binder passed the SUPERPAVE™ criteria and the modified binders showed significant increase in the rutting index. Without being bound by any one theory, this improvement can be attributed to the aforementioned stiffening effect caused by the addition of the modifiers and found to be consistent with the viscosity analyses at high service temperatures. The higher the modifier content, the higher the resistance to rutting. Modifier type, pyrolysis method, particle size and HTT showed less effect on the rutting resistance of the modified binder.

Figure 8:
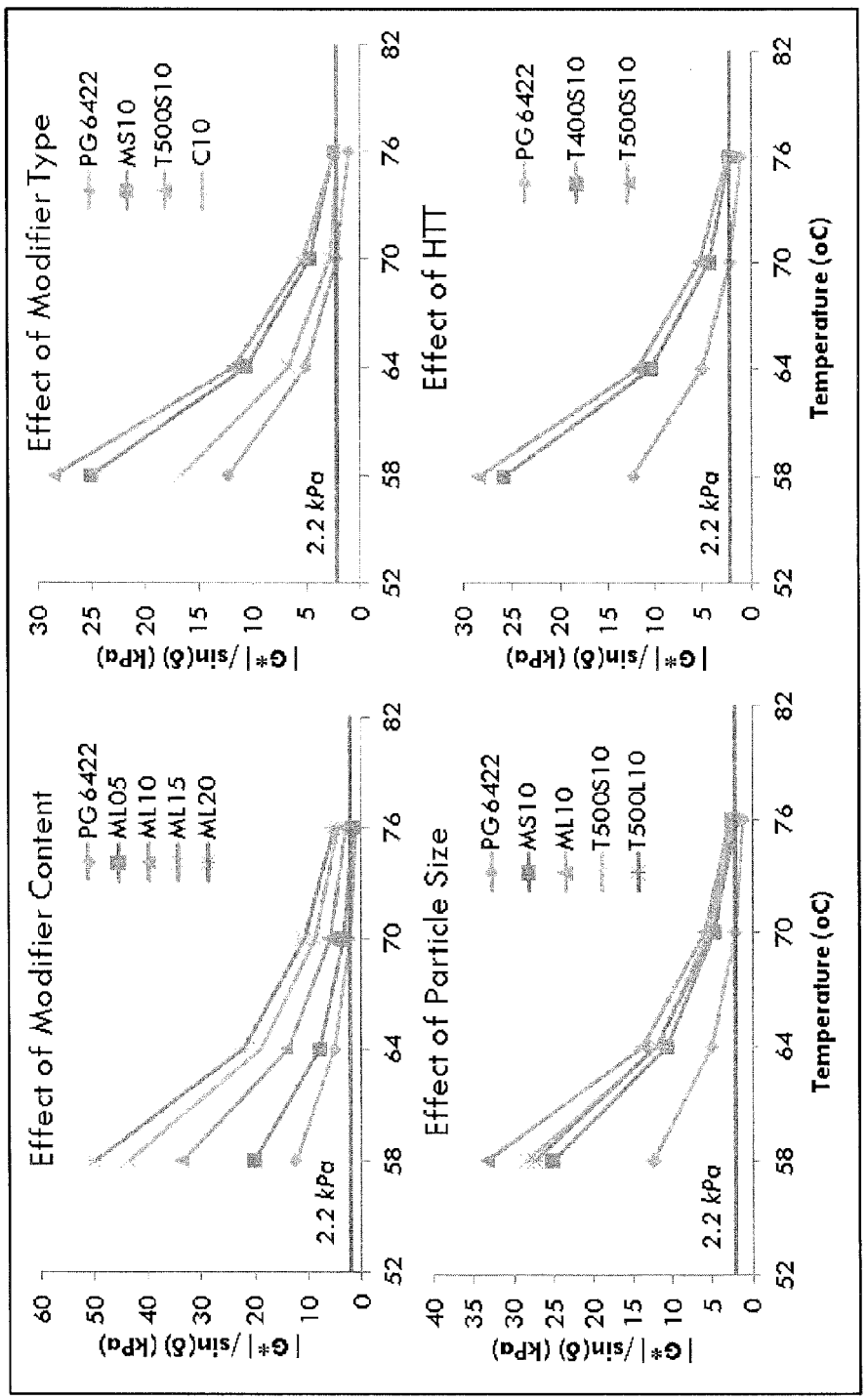
FIG. 8 is a set of graphs showing rutting index (G*/sin(δ)) (kilopascals, kPa)) of short-term aged asphalt binder compositions at high service temperatures (58, 64, 70, or 76 degrees Celsius (° C.)). A value of 2.2 kPa (straight, unmarked line) was set as the minimum by SUPERPAVE™ criteria.

FIG. 8 shows the results of rutting index (G*/sin(δ)) for short term-aged binders measured at high service temperatures, with the SUPERPAVE™ minimum criteria of 2.2 kPa marked in the figure. The improvement of all the modifiers on rutting resistance of the short term-aged binder was very similar to that on the un-aged binder reflected in FIG. 7. This indicates that the modification on the rutting resistance of the un-aged binder remains and changes little with the modifier production parameters after manufacture and construction of HMA pavements (short term aging). An exception was activated carbon, which demonstrated similar capability of modification to bio-char on un-aged binder, but lower capability as compared to bio-char after short term aging. Thus, it appears that bio-char is a more effective modifier than activated carbon in terms of increasing rutting resistance of asphalt binder.

Figure 9:
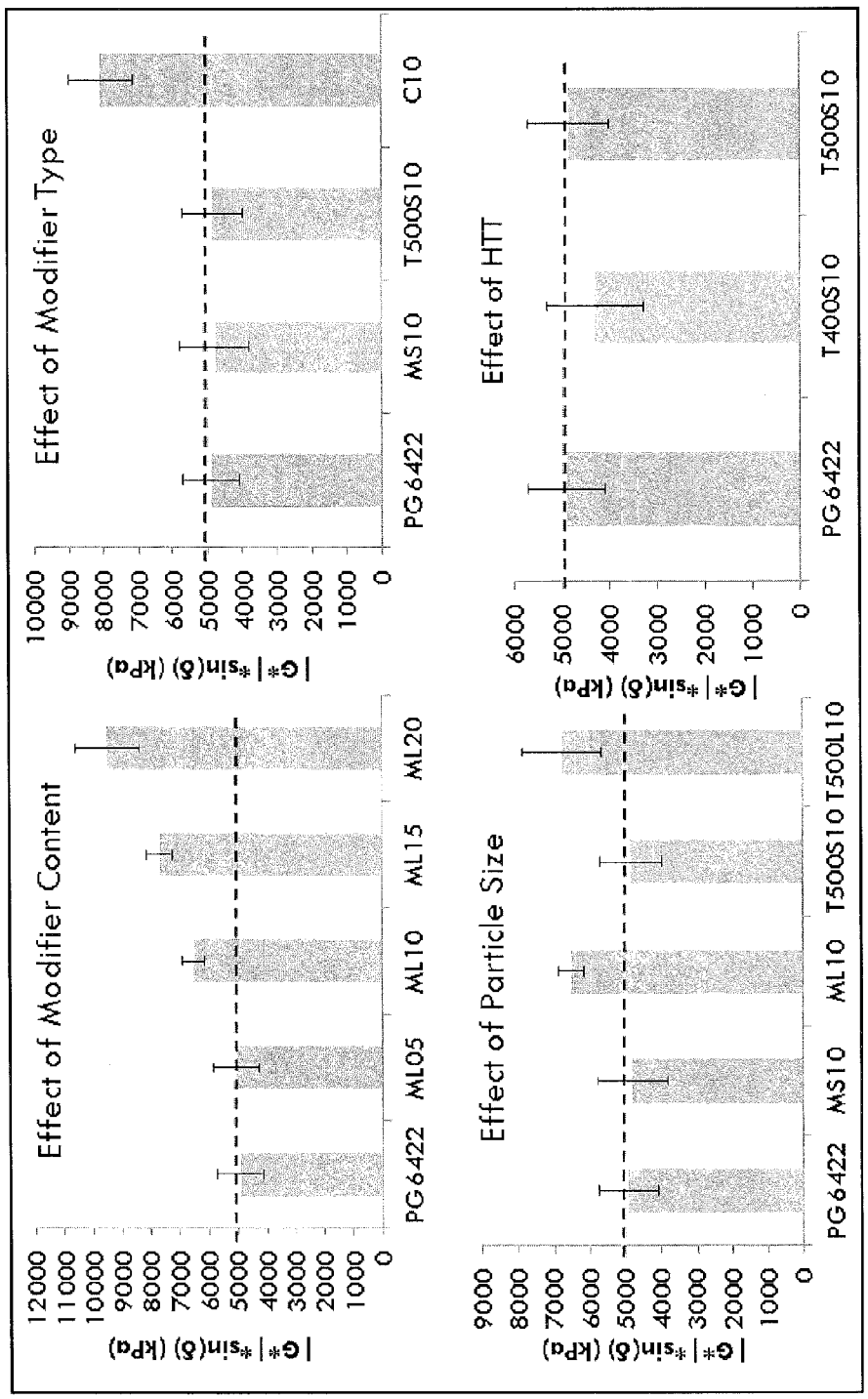
FIG. 9 is a set of bar graphs showing the fatigue cracking index (G*sin(δ), kilopascals (kPa)) for long-term aged asphalt binder compositions at 25 degrees Celsius (° C.). The dotted lines represent 5000 kPa, the maximum limit for the fatigue cracking index of asphalt binder subjected to rolling thin film oven (RTFO) and pressure aging vessel (PAV) aging at intermediate service temperature (25° C. for PG6422 binder).

The results of G* sin(δ), a fatigue cracking index used by the SUPERPAVE™ specification, were measured and arranged in FIG. 9. The SUPERPAVE™ specification sets a maximum limit of 5000 kPa (in broken line in FIG. 9) for the fatigue cracking index of asphalt binder subjected to RTFO and PAV aging at intermediate service temperature (25° C. for PG 64-22 binder). According to FIG. 9, four modified samples as well as the unmodified binder passed the fatigue cracking criteria. The production parameters of the qualified modifiers were recapped in Table 3, below. It appears that lower modifier content, smaller particle size, and lower HTT are positive properties regarding fatigue cracking resistance of the modified binder. Without being bound to any one theory, this could be related to combined effect of the modifier's ability of reducing oxidation and its integration with the asphalt binder. The observation that samples with high modifier content showed negative effects on the binder's fatigue cracking resistance can help to determine the amount for the addition of bio-modifiers. Activated carbon appears to be a poorer additive, while pyrolysis type has little effect in terms of fatigue performance.

TABLE 3

Production parameters of the qualified samples.

| Sample ID | Modifier Type | Highest Treatment Temperature (HTT) (° C.) | Particle Size | Modifier Content (wt. %) |
|---|---|---|---|---|
| ML05 | Microwave | 500 | Coarse | 5 |
| MS10 | Reactor Biochar | 500 | | 10 |
| T400S10 | Tube | 400 | Fine | 10 |
| T500S10 | Furnace Biochar | 500 | | 10 |

Example 5

Ductility

Pavement cracking can correlate well with asphalt binder ductility, provided it is measured at the appropriate temperature. See Glover, C. J., et al., "Development of a new method for assessing asphalt binder durability with filed validation," Report No. FHWA/TX-05/1872-2, Texas Department of Transportation, Research and Technology Implementation Office, 2005. Previous reports indicate that ductility measured at reduced temperature and elongation rate (e.g., 15° C. and 1 cm/min) is a good indicator of the cracking condition of asphalt binders, and demonstrated that this specific ductility can be replaced by G'/(η'/G') measured at 10 rad/s, 44.7° C. using DSR. See Glover, C. J., et al., "Development of a new method for assessing asphalt binder durability with filed validation," Report No. FHWA/TX-05/1872-2, Texas Department of Transportation, Research and Technology Implementation Office, 2005; and Ruan, Y., et al., *Petroleum Science and Technology*, 2003, 21(1-2): 231-254. The same method was adopted in measuring ductility in the presently disclosed studies. G' and η' stand for storage modulus and dynamic viscosity of the asphalt binder, respectively. The lower the ductility index, the higher the cracking resistance of the binder. All the samples were submitted to RTFO and PAV aging before DSR testing was conducted, as cracking mostly occurs at long-term service.

Figure 10:
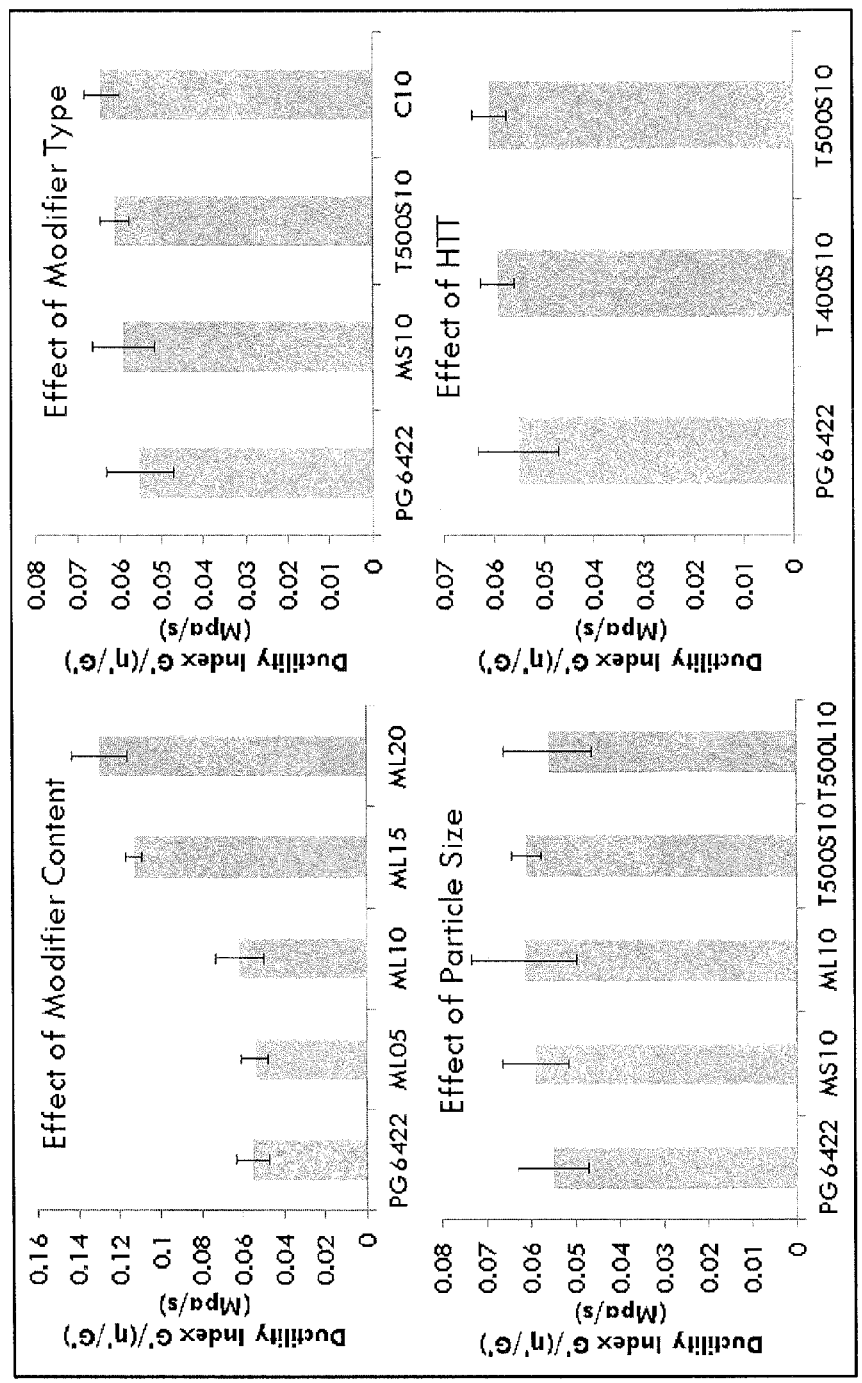
FIG. 10 is a set of bar graphs showing ductility indexes (G'/η* /G' (megapascals per second (MPa/s))) of asphalt binder compositions measured at 44.7 degrees Celsius (° C.) after long term aging.

FIG. 10 presents the results of ductility index G'/(η'/G') measured at 44.7° C. after short term and long term aging. The ductility index of modified samples incorporated in a small amount (no higher than 10%) was not significantly different from that of unmodified binder. This observation verified the finding obtained from the fatigue cracking index analyses that the presently disclosed bio-modifiers appear to be additives that would not compromise the cracking resistance of the modified asphalt binder. The ductility index seems insensitive to the production parameters of the bio-modifier.

Table 4 summarizes some of the observations made regarding the effects of the addition of different modifiers to asphalt binder in Examples 3-5. In Table 4, "+" indicates a positive effect on the property or performance, "−" indicates a negative effect, and "NE", indicates little or no effect.

TABLE 4

Summary of Effects of Modifier Addition to Asphalt Binder.

| Sample ID | η* (High Temp) | η* (Low Temp) | aging | Rutting (un-aged) | Rutting (aged) | Fatigue | Ductility |
|---|---|---|---|---|---|---|---|
| PG6422 | | | | | | | |
| ML05 | + | NE | NE | + | + | NE | NE |
| ML10 | + | NE | − | + | + | − | NE |
| ML15 | + | − | NE | + | + | − | − |
| ML20 | + | − | − | + | + | − | − |
| MS10 | + | NE | + | + | + | NE | NE |
| T400S10 | + | NE | + | + | + | + | NE |
| T500S10 | + | NE | + | + | + | NE | NE |
| T500L10 | + | NE | NE | + | + | − | NE |
| C10 | + | − | NE | + | + | − | NE |

Example 6

Hot Mix Asphalt Sample Preparation

Figure 11:
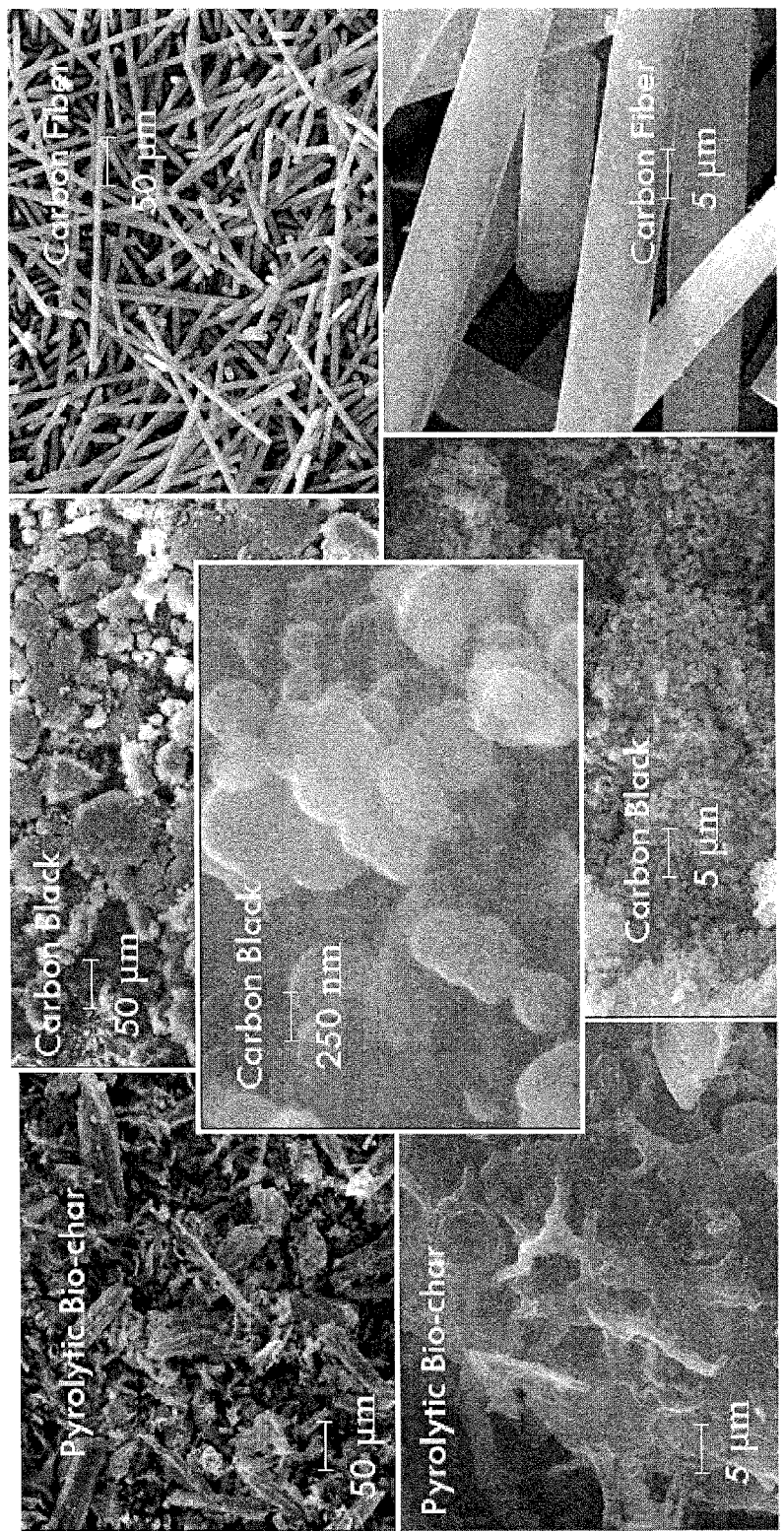
FIG. 11 is a set of scanning electron micrographs (SEM) of different carbon-based asphalt binder modifiers at different magnification.

Bio-char produced via a slow (Tube-Furnace) pyrolysis method with a HTT of 400° C. and a particle size of smaller than 75 μm was used in further studies as a binder modifier for hot mix asphalt (HMA). Commercially available carbon black (average diameter of 80 nm and surface area of over 20 m²/g) and carbon fiber (6-7 μm in diameter, tensile strength 4200-4550 MPa, modulus 230 GPa) were used as reference modifiers for comparison. FIG. 11 shows SEM images of the different additives. As indicated in FIG. 11, the different modifiers have different structures and surface textures. Carbon black comprises micro-carbon pellets with a smooth texture, while carbon fiber has a rod-like geometry and very fibrous nature. Bio-char is comprised of irregularly shaped particles with a porous structure, which can behave like a combination of porous carbon fiber and micro-particles. In addition, it is believed that the porous and rough surface textures of the bio-char can help the interaction between bio-char and asphalt binder, leading to improved performance of asphalt mixture.

The modifiers were mixed with asphalt binder (i.e., a PG 64-22 binder). Six modified binder mixtures and one control binder were prepared as indicated in Table 5.

TABLE 5

Binders for Hot Mix Asphalt.

| Asphalt Mixture | Additive | Additive Content (%) |
|---|---|---|
| PG 64-22 Control Mix | N/A | N/A |
| Modified Mix | Bio-char | 5 |
|  |  | 10 |
|  | Carbon Black | 5 |
|  |  | 10 |
|  | Carbon Fiber | 5 |
|  |  | 10 |

The other components of the HMA were coarse aggregate (i.e., gravel D-rock with a nominal maximum aggregate size (NMAS) of 9.5 mm), fine aggregates (i.e., No. 10 (2 mm) screenings) and natural sand. Their gradations and other properties are presented in Table 6.

TABLE 6

Aggregate Gradiations and Bulk Specific Gravity ($G_{sb}$)

| Sieve size (mm) | Gravel D-rock | No. 10 screening | Natural sand |
|---|---|---|---|
| 16 | 100% | 100% | 100% |
| 12.5 | 92% | 100% | 100% |
| 9.5 | 71% | 100% | 100% |
| 4.75 | 23% | 93% | 98% |
| 2.36 | 15% | 59% | 76% |
| 0.60 | 9% | 22% | 37% |
| 0.30 | 6% | 15% | 17% |
| 0.15 | 4.0% | 11.4% | 7.0% |
| 0.075 | 2.5% | 9.5% | 3.2% |
| $G_{sb}$ | 2.511 | 2.704 | 2.498 |

The Marshall mix-design procedure was employed to design an aggregate mixture comprising 50% gravel D-rock, 25% No. 10 screening, and 25% natural sand. The optimum asphalt content was determined on the control mix of asphalt binder to be 5.7% by weight of the total mixture. In order to evaluate the effects of the modified binders, 5.7% control mix asphalt binder/modified asphalt binder was held constant for all the mixtures.

Asphalt binder and aggregates were heated for 2 hours in an oven to 165° C. prior to mixing. Meanwhile, the carbon-based modifiers were dried at 120° C. for 2 hours and then blended with heated asphalt binder at target concentrations (5 weight % or 10 weight %) using a mixing device designed for mastic research. See Huang, B., et al., *International Journal of Pavement Engineering*, 2007, 8(1): 1-9. Samples for DSR test were collected immediately after the blending, then the modified binders were mixed in the laboratory with heated aggregates for 2 minutes. The newly produced mixtures were then kept in an oven for 2 hours for short-term aging prior to compaction. Cylindrical samples 150 mm high by 100 mm in diameter were compacted using a SUPERPAVE™ gyratory compactor (SGC). The unmodified binder for the control mix was stirred for the same period of time before compaction to minimize the variations caused by mixture production. The air voids of samples for the indirect tension test (IDT) and semi-circular bending (SCB) notch test were 4±0.5% and those for asphalt pavement analyzer (APA) and tensile strength ratio (TSR) tests were 7±1%. All the samples were evaluated in triplicate.

Example 7

Dynamic Shear Rheometer

A dynamic shear rheometer (DSR) test was conducted to show the different properties caused by adding a carbon-based modifier. The complex shear modulus (G*) of samples of unmodified and modified binder were obtained from the DSR test using samples of 8 mm diameter according to AASHTO TP5. Since a PG 64-22 binder was used, 64° C. and −10° C. were selected to characterize the modification at high and low service temperatures at a loading frequency of 10 rad/s.

Figure 12:
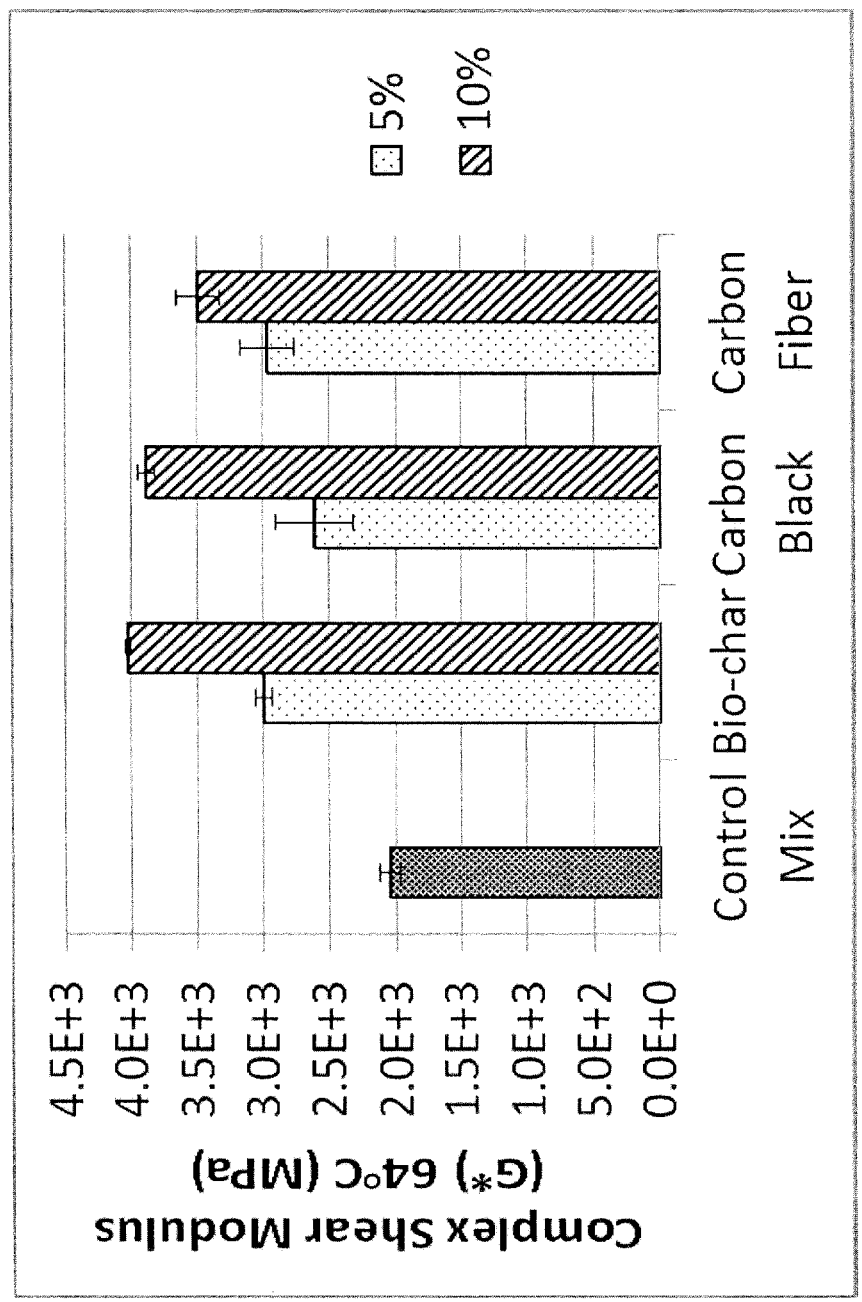
FIG. 12 is a bar graph showing complex shear modulus (G*, megapascals (MPa)) at high service temperature (i.e., 64 degrees Celsius (° C.)) of asphalt binders with and without (control mix, cross-hatched bar) carbon-based modifier. The modifiers include 5 (stippled bars) or 10 (striped bars) weight percentage (%) pyrolytic bio-char (produced as described for FIG. 11), carbon black, or carbon fiber as indicated on the x-axis.
Figure 13:
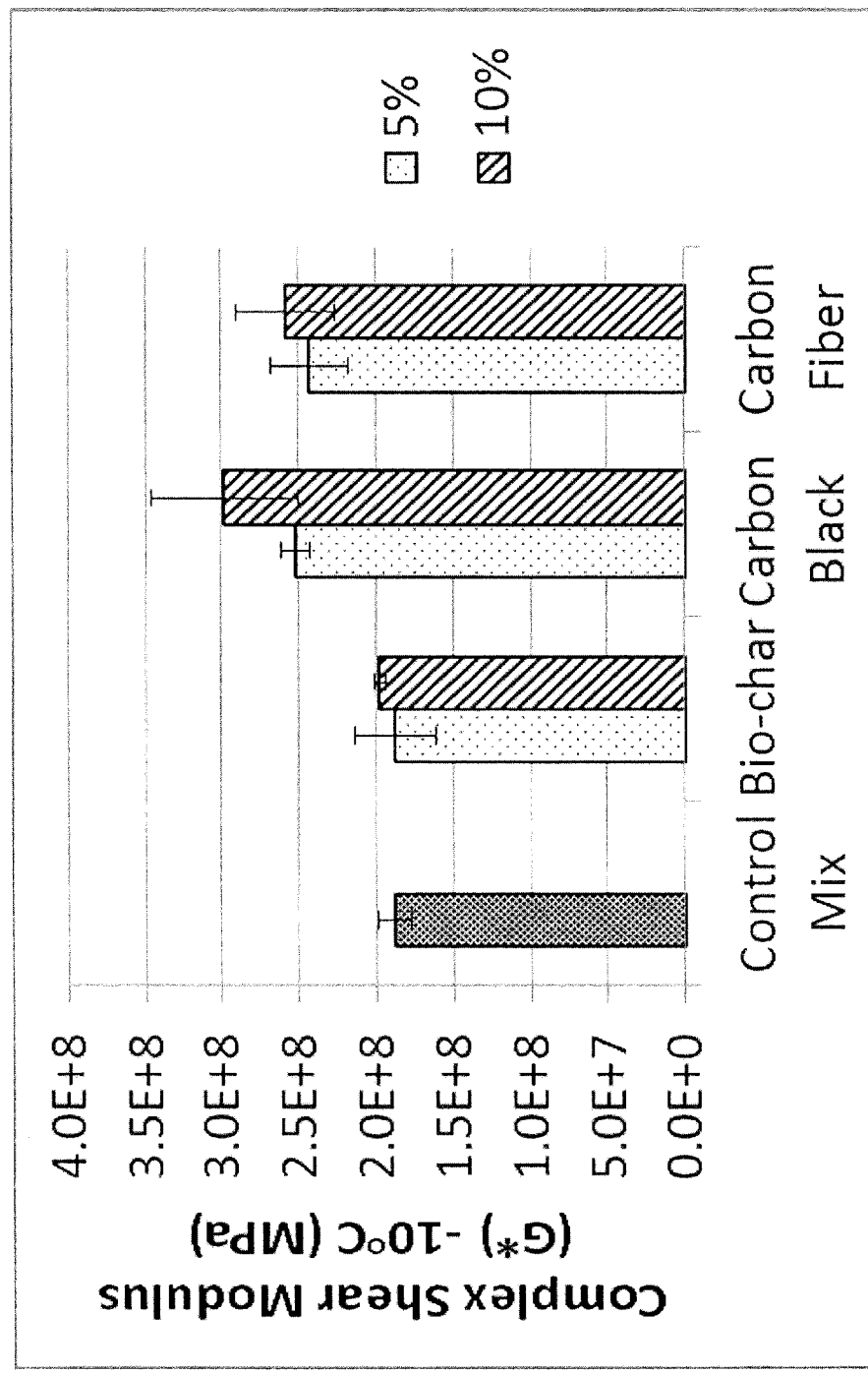
FIG. 13 is a bar graph showing complex shear modulus (G*, megapascals (MPa)) at low service temperature (i.e., –10 degrees Celsius (° C.)) of asphalt binders with and without (control mix, cross-hatched bar) carbon-based modifier. The modifiers include 5 (stippled bars) or 10 (striped bars) weight percentage (%) pyrolytic bio-char (produced as described for FIG. 11), carbon black, or carbon fiber as indicated on the x-axis.

FIG. 12 and FIG. 13 show G* results at high and low temperatures, respectively. G* increases with the addition of the additives. It appears that bio-char has the highest stiffening effect at high service temperatures, which can lead to a higher rutting resistance of the modified binder. It can be seen in FIG. 3 that bio-char shows little effect on G* at −10° C., which is consistent with the findings described above. However, the addition of both carbon black and carbon fiber significantly increased the G* of the binder at low temperatures, and thus could potentially lead to a poor resistance to low temperature cracking. This observation suggests that bio-char can be a more effective asphalt modifier compared with carbon black and carbon fiber by reducing the temperature susceptibility of asphalt binder.

Example 8

Rutting Resistance

Resilient modulus ($M_R$) can be used as an indicator of the rutting resistance of asphalt mixtures. The higher the $M_R$ value, the higher the rutting resistance of an asphalt mixture. Testing procedures for $M_R$ have been described previously. See Zhao, S., et al., "Laboratory performance evaluation of warm mix asphalt containing high percentages of RAP," In *Transportation Research Record Journal of the Transportation Research Board*, 2012, 2294: 98-105; and Zhao, S., et al., *Construction and Building Materials*, 2013, 44: 92-100.

$M_R$ for each mixture was calculated using the equation:

$$M_R = (P \times GL)/(\Delta H \times t \times D \times C_{cmpl})$$

where $M_R$ is resilient modulus (psi); P is maximum load (pound force, lbf); GL is gage length (inch); ΔH is horizontal deformation (inch); t is sample thickness (inch), D is sample diameter (inch); and $C_{cmpl}$ is a nondimensional creep compliance factor calculated by the formula: $0.6354(X/Y)^{-1} - 0.332$, where (X/Y) is the ratio of horizontal to vertical deformation.

Figure 14:
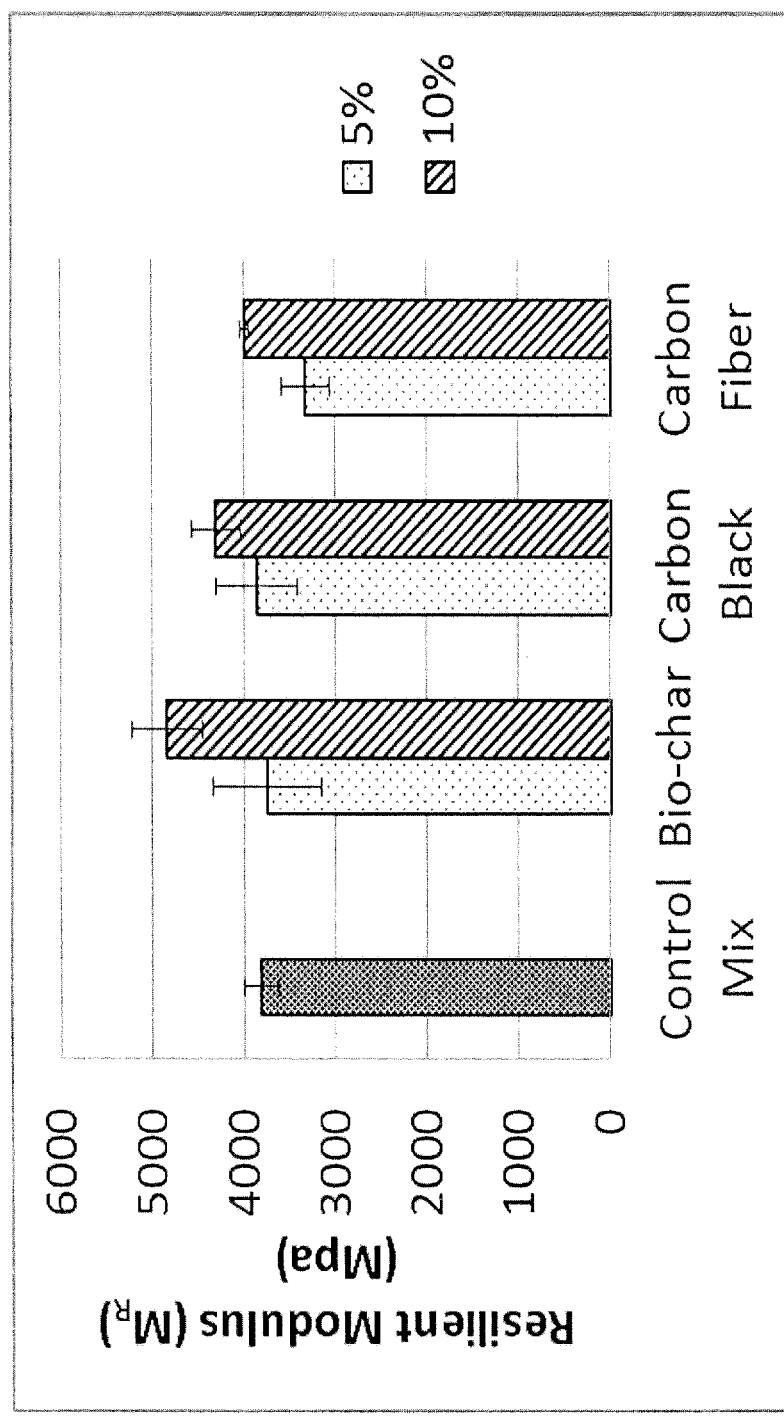
FIG. 14 is a bar graph showing the resilient modulus ($M_R$, megapascals (MPa)) at 25 degrees Celsius (° C.)) of asphalt mixtures with and without (control mix, cross-hatched bar) carbon-based modifier in the asphalt binder. The asphalt binder contained 5 (stippled bars) or 10 (striped bars) weight percentage (%) pyrolytic bio-char (produced as described for FIG. 11), carbon black, or carbon fiber as indicated on the x-axis.

FIG. 14 illustrates the $M_R$ results for the binder/aggregate mixtures described in Example 6. All three additives increased the resilient modulus if added up to 10%. Without being bound to any one theory, it is believed that this can be attributed to the stiffening effect of the solid powder-like additives. The fact that carbon fiber showed insignificant effect can be related to its interaction with the binder. The rod-like micro-fibers could not be uniformly blended with the binder-aggregate matrix during the mixture production, thus resulting in a slightly poor structure of the matrix, although the carbon fibers were cut into micro-sizes. The 10% bio-char modified mixture showed the highest $M_R$, indicating that bio-char can have good interaction with the binder during the mixing, which can lead to a better resistance to rutting distress.

Figure 15:
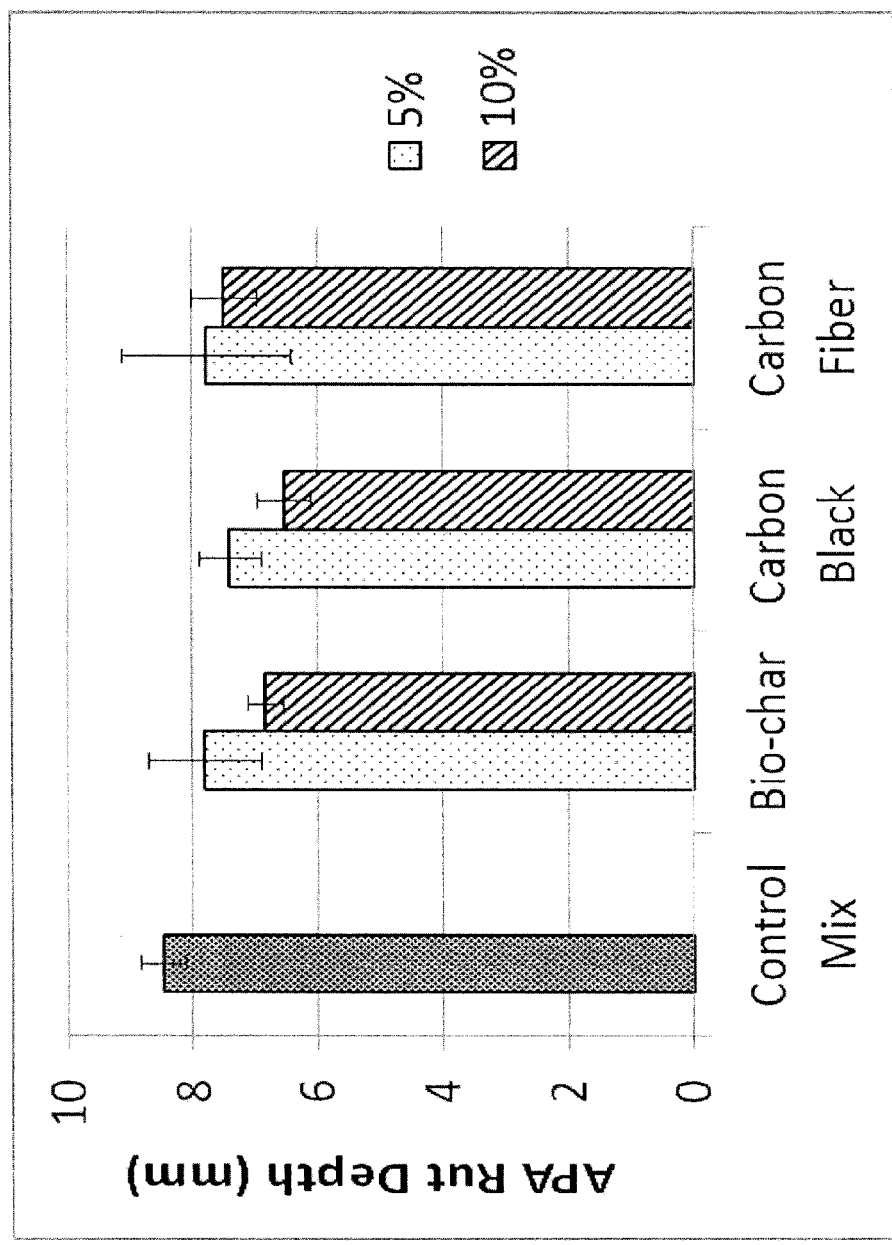
FIG. 15 is a bar graph showing asphalt pavement analyzer (APA) rutting test rut depth (millimeters, mm) after 8000 cycles of asphalt mixtures with and without (control mix, cross-hatched bar) carbon-based modifier in the asphalt binder. The asphalt binder contained 5 (stippled bars) or 10 (striped bars) weight percentage (%) pyrolytic bio-char (produced as described for FIG. 11), carbon black, or carbon fiber as indicated on the x-axis.

The APA rutting test was performed at 64° C. in accordance with AASHTO T340. The rut depths at 8,000 cycles were recorded for evaluating rutting resistance of the mixtures. See FIG. 15. The addition of the modifiers improved the rutting resistance, especially bio-char and carbon black at higher contents. This observation was consistent with results from the G* at high service temperature and $M_R$. Thus, it appears that bio-char is promising as an additive in reducing rut distress.

Example 9

Moisture Susceptibility

Both $M_R$ ratio and TSR were used to determine the moisture susceptibility of asphalt mixtures by calculating the ratio of $M_R$ and tensile strength of unconditioned to conditioned samples with 7%±0.5% air voids. The AASHTO T 283 was followed for the tensile strength and freeze-thaw conditioning procedures. A TSR value of 0.8 is recommended in AASHTO M 320 as a criterion for good resistance to moisture susceptibility.

Figure 16:
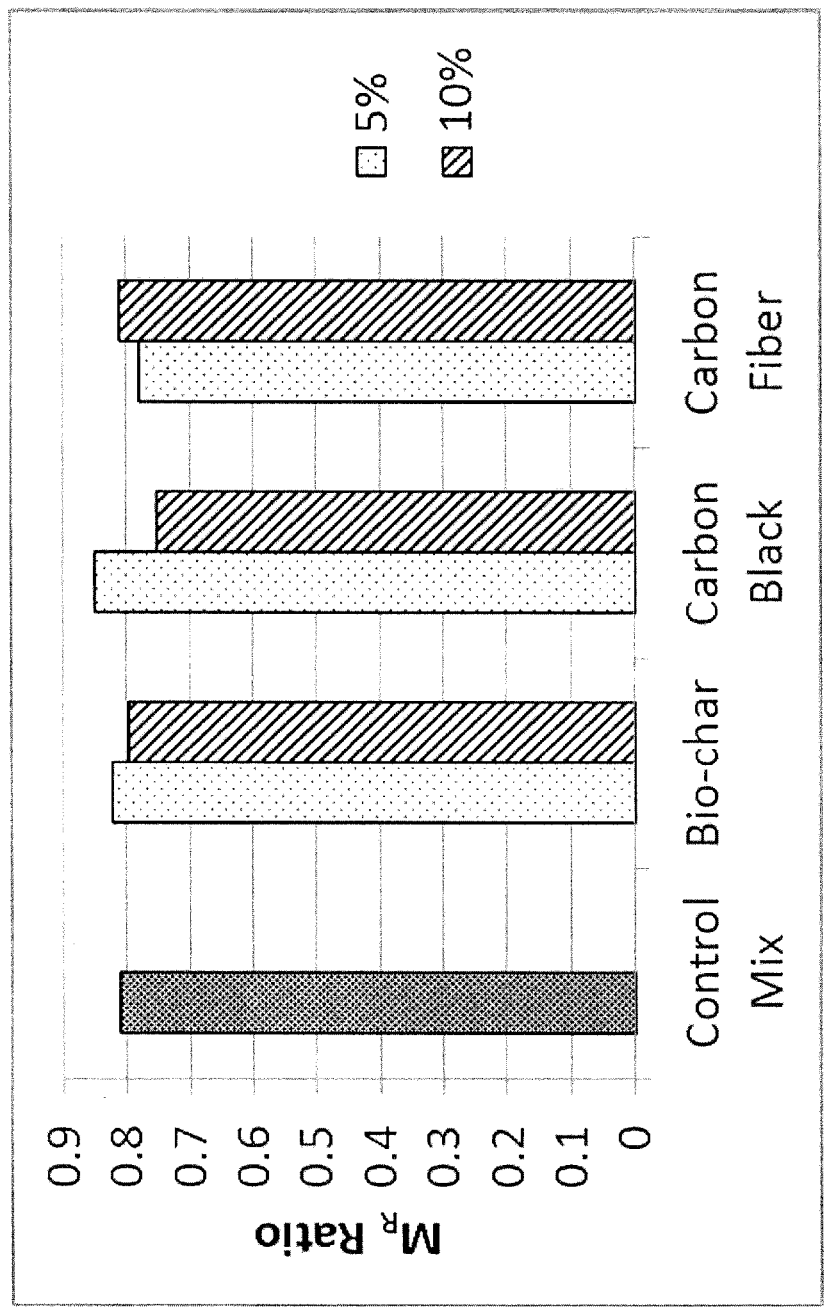
FIG. 16 is a bar graph showing resilient modulus ($M_R$) ratio of asphalt mixtures with and without (control mix, cross-hatched bar) carbon-based modifier in the asphalt binder after a freeze-thaw cycle. The asphalt binder contained 5 (stippled bars) or 10 (striped bars) weight percentage (%) pyrolytic bio-char (produced as described for FIG. 11), carbon black, or carbon fiber as indicated on the x-axis.
Figure 17:
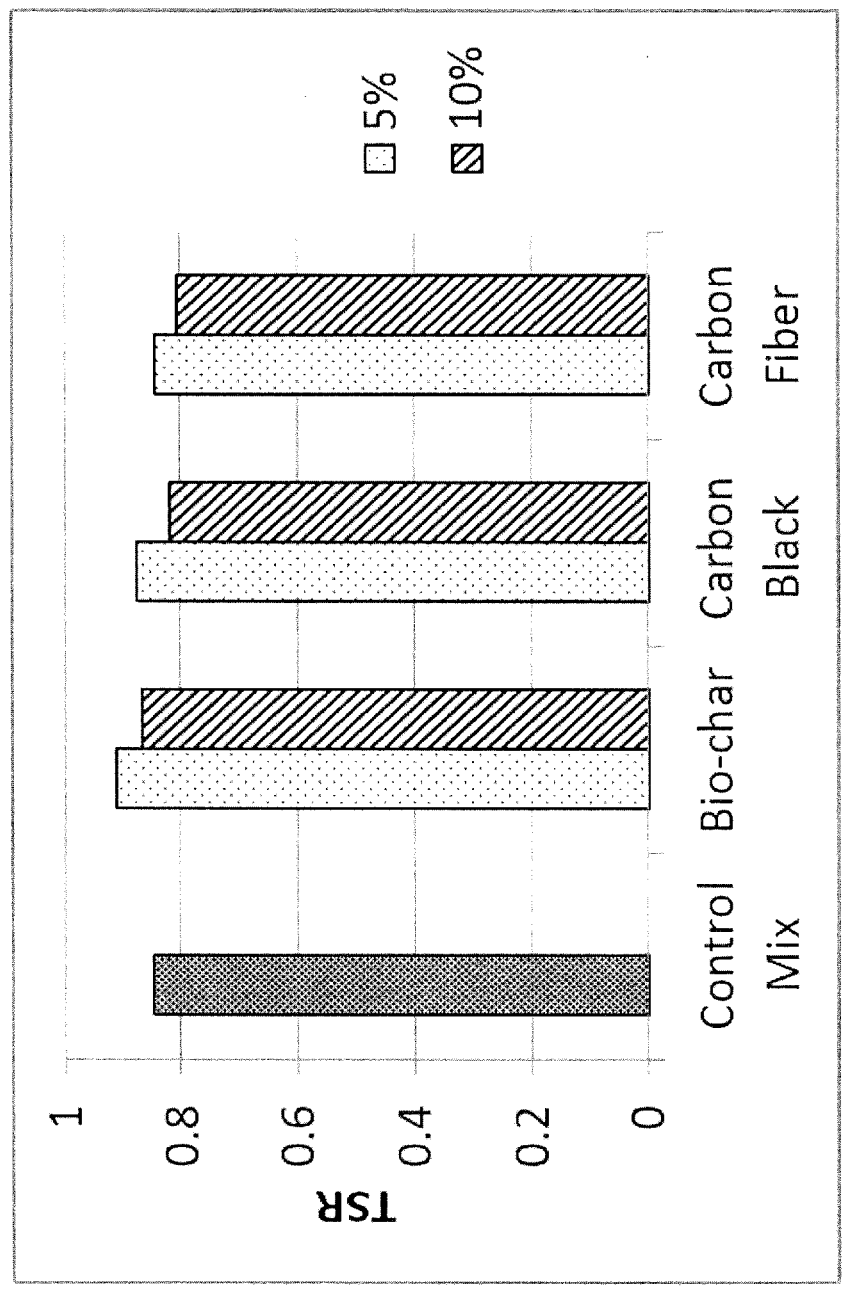
FIG. 17 is a bar graph showing the tensile strength ratio (TSR) of asphalt mixtures with and without (control mix, cross-hatched bar) carbon-based modifier in the asphalt binder after a freeze-thaw cycle. The asphalt binder contained 5 (stippled bars) or 10 (striped bars) weight percentage (%) pyrolytic bio-char (produced as described for FIG. 11), carbon black, or carbon fiber as indicated on the x-axis.

FIGS. 16 and 17 present the $M_R$ ratio and TSR results. Generally, the moisture resistance was slightly increased in most mixtures. The 10% addition of carbon black appeared to result in an obvious decrease in modulus, but could satisfy the AASHTO specification of TSR being over 0.8. The modifier content was found to affect the moisture resistance with the following tendency: the more modifier added, the more susceptible the mixture became to moisture. The mixtures modified with 10% carbon black or carbon fiber were found to be on the verge of meeting the 80% TSR criterion while the bio-char modified mixtures could easily meet this requirement, indicating that bio-char can have a higher capability of improving moisture resistance than the other two carbon-based additives.

Example 10

Cracking Performance

Dissipated Creep Strain Energy Threshold ($DCSE_f$) can be obtained from the SUPERPAVE™ IDT tests and used to evaluate the cracking resistance of asphalt mixtures. See Chen, X. B., et al., *Construction and Building Materials*, 2008, 22(9): 1950-1962. A higher $DCSE_f$ value typically indicates a capability for accommodating more dissipated energy in the mixture, thus leading to a better fatigue resistance of asphalt mixtures.

The Semi-circular Bending (SCB) fracture test was conducted on specimens with different notch depths at 25° C. at a constant rate of 0.5 mm/min. The critical value of J-integral ($J_c$) can be obtained and used as an indicator of fracture resistance of asphalt mixtures. See Mull, M. A., et al., *Journal of Materials Science*, 2002, 37(3): 557-566; and Wu, Z., et al., *Journal of ASTM International*, 2005, 2(3); DOA 10.1520/JAI12264. Three notch depths were used: 7.6 mm (0.3 inch), 15.2 mm (0.6 inch) and 25.4 mm (1 inch). The strain energy to failure was calculated for each notch as the numerical number of the area under the load vs. vertical deflection curve up to the peak load. Then the following equation was used to determine the critical J-integral:

$$J_C = -\left(\frac{1}{b}\right)\frac{dU}{da}$$

where $J_C$=J-integral (kJ/m$^2$); b=thickness of the specimen (m); a=notch depth (m); U=strain energy to failure (kJ/m).

Figure 18:
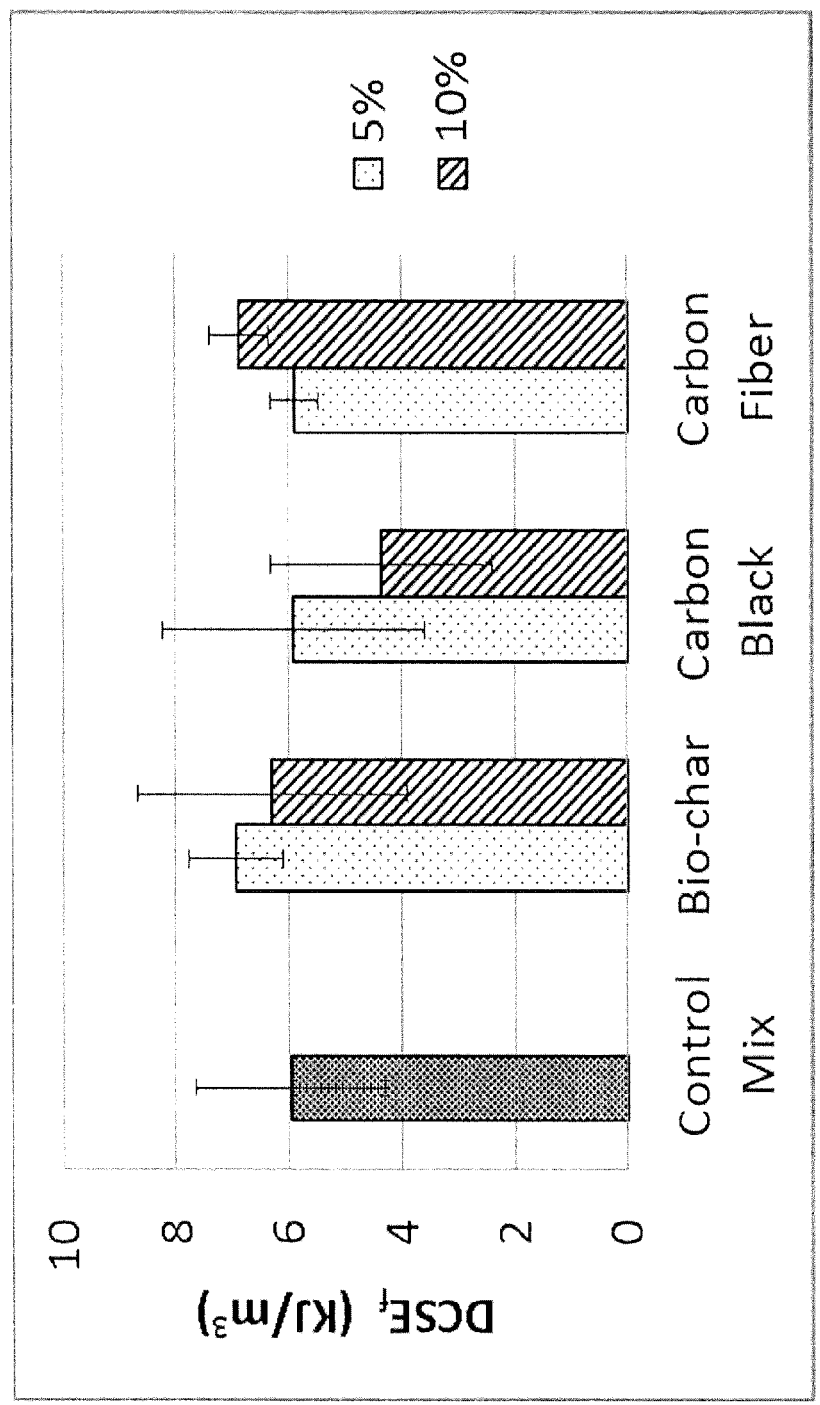
FIG. 18 is a bar graph showing dissipated creep strain energy, $DCSE_f$, in kilojoules per cubic meter ($KJ/m^3$) of asphalt mixtures with and without (control mix, cross-hatched bar) carbon-based modifier in the asphalt binder after a freeze-thaw cycle. The asphalt binder contained 5 (stippled bars) or 10 (striped bars) weight percentage (%) pyrolytic bio-char (produced as described for FIG. 11), carbon black, or carbon fiber as indicated on the x-axis.

FIG. 18 shows $DCSE_f$ results. An increase in bio-char or carbon black content generally reduced the $DSCE_f$ value, compromising the cracking resistance of modified mixtures. However, 5% bio-char was found to increase the $DCSE_f$ value and, even the mixture with 10% bio-char showed similar $DCSE_f$ result compared to the control mix. Meanwhile, carbon black did not show beneficial effect on cracking resistance even added in a small amount (5%). The modification effect of carbon fiber was insignificant when added at 5%. However, its effect became significant at a dosage of 10%. Without being bound to any one theory, this phenomenon is attributed to the fibrous nature of the carbon fiber. It is believed to function as reinforcement just as in concrete, bridging the cracks and arresting crack propagation, thus leading to a higher cracking resistance. The carbon fiber can perform even better at higher contents. However, use of this fibrous material is limited by such concerns as workability, dispersion, and moisture susceptibility.

Figure 19:
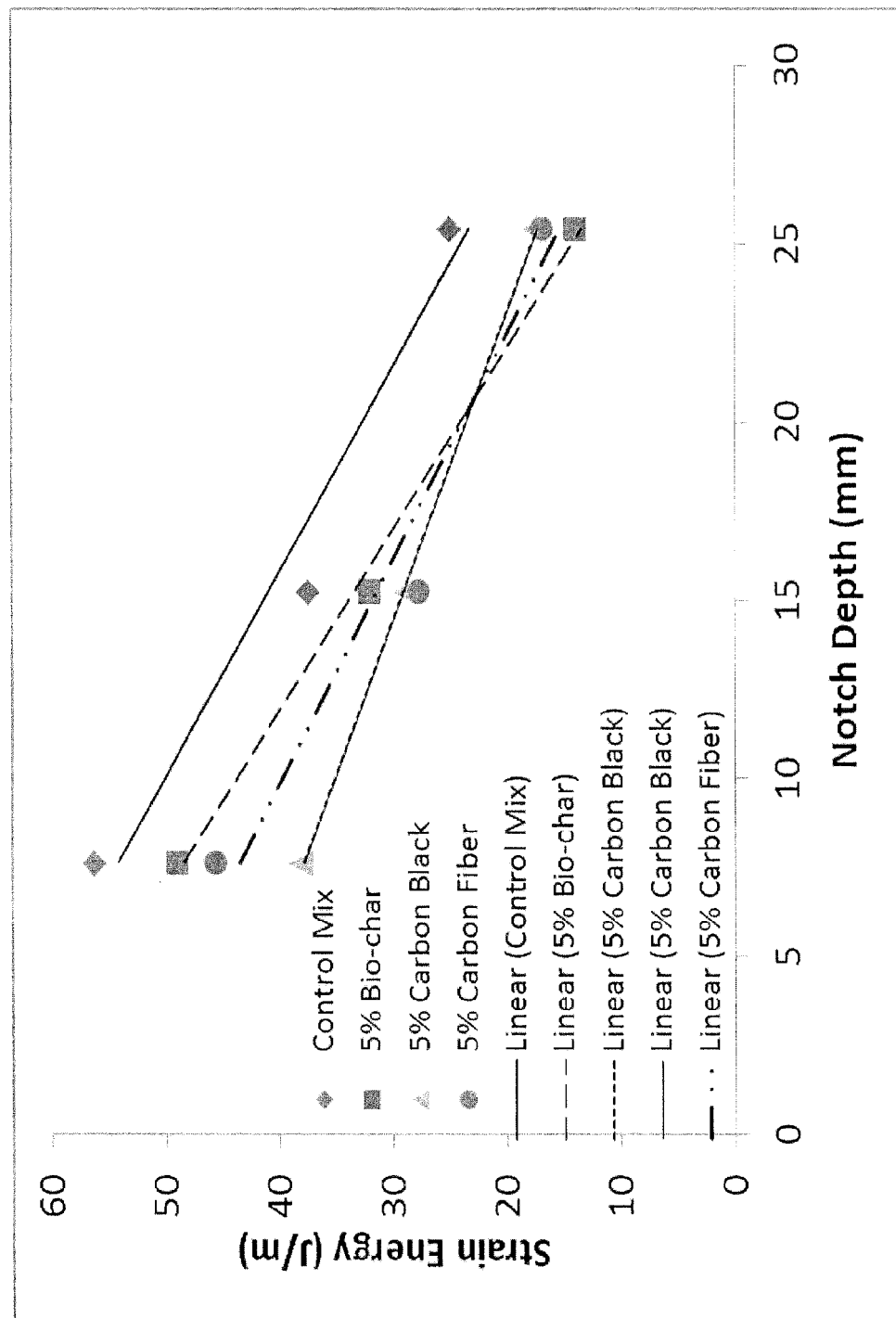
FIG. 19 is a graph showing change in dissipated strain energy (Joules per meter (J/m)) as a function of notch depth (millimeters, mm) for asphalt mixtures with and without carbon-based modifier in the asphalt binder. Data for an asphalt mixture containing binder comprising 5% pyrolytic bio-char (produced as described for FIG. 11) is shown in squares and the dashed line with large dashes. Data for an asphalt mixture containing binder comprising 5% carbon black is shown with triangles and the overlapping dashed (small dashes) and plain line. Data for an asphalt mixture containing binder comprising 5% carbon fiber is shown with circles and the dashed and dotted line. Data for an asphalt mixture containing unmodified binder is shown with diamonds and a plain line.
Figure 20:
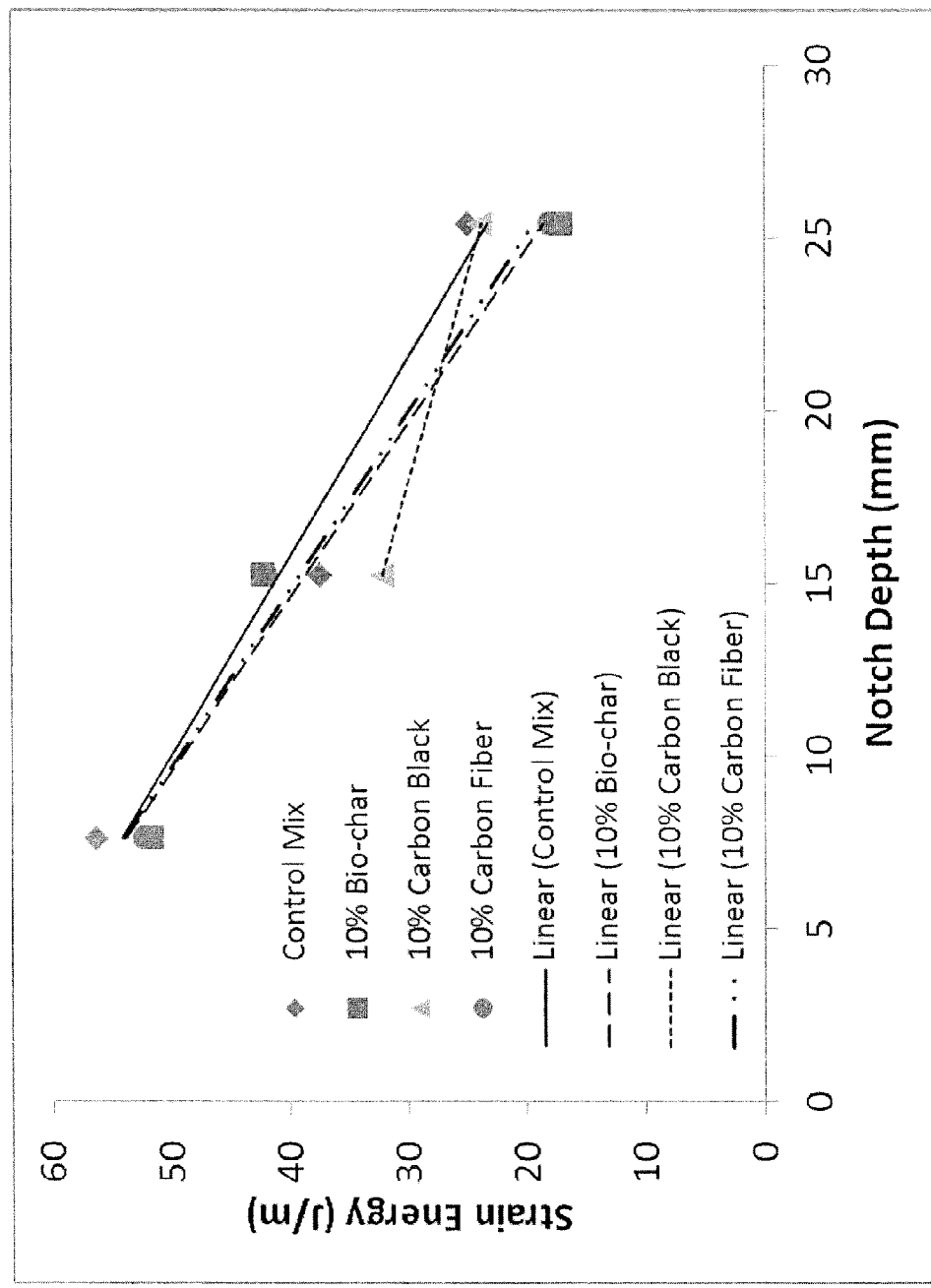
FIG. 20 is a graph showing the change of dissipated strain energy (joules per meter (J/m)) as a function of notch depth (millimeters, mm) for asphalt mixtures with and without carbon-based modifier in the asphalt binder. Data for an asphalt mixture containing binder comprising 10% pyrolytic bio-char (produced as described for FIG. 11) is shown in squares and the dashed line with large dashes. Data for an asphalt mixture containing binder comprising 10% carbon black is shown with triangles and the dashed line with small dashes. Data for an asphalt mixture containing binder comprising 10% carbon fiber is shown with circles and the dashed and dotted line. Data for an asphalt mixture containing unmodified binder is shown with diamonds and a plain line.
Figure 21:
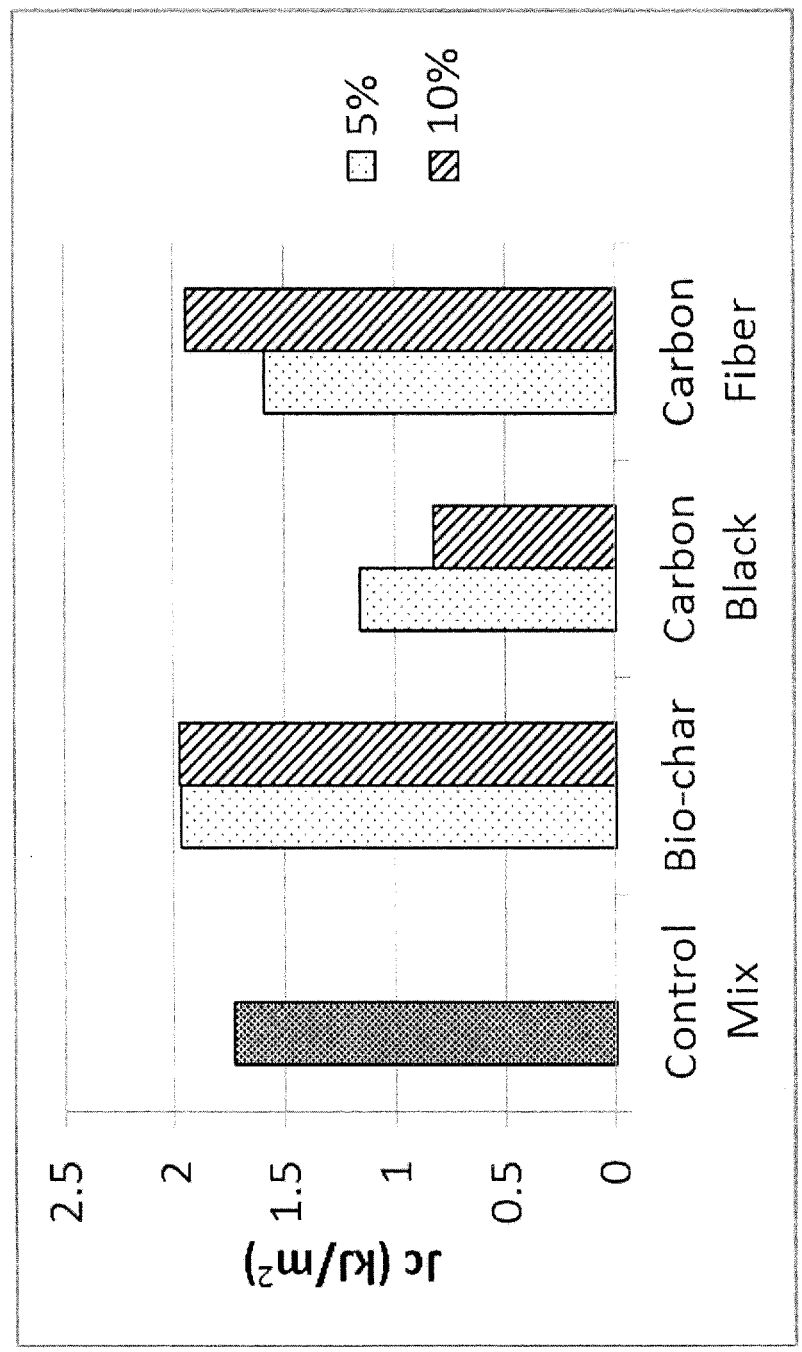
FIG. 21 is a graph of J integral, Jc, in kilojoules per square meter ($kJ/m^2$) of asphalt mixtures with and without (control mix, cross-hatched bar) carbon-based modifier in the asphalt binder. The asphalt binder contained 5 (stippled bars) or 10 (striped bars) weight percentage (%) pyrolytic bio-char (produced as described for FIG. 11), carbon black, or carbon fiber as indicated on the x-axis.

FIGS. 19 and 20 show the change of the dissipated strain energy with the notch depth. FIG. 21 shows the J-integral obtained for each mix. Samples with 7.6 mm notch in the 10% carbon black group were broken during production, so the $J_c$ value for that mixture was obtained based on two points. As can be seen in FIG. 21, the effects of additives in terms of J-integral were similar to that obtained from $DCSE_f$ results. Bio-char increased the $J_c$ value so as to increase the cracking resistance of the mixture. Carbon black showed adverse effects on the mixture in terms of $J_c$ results while carbon fiber proved to be positive when added in a higher amount. This consistency further suggests the effectiveness of bio-char as an asphalt modifier.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for preparing a solid bio-modifier composition for asphalt, the method comprising: providing a non-wood bio-mass material; and treating the non-wood biomass material under conditions suitable to produce a solid bio-modifier composition comprising bio-char, wherein the bio-char has an average particle size of about 150 microns or less.

2. The method of claim 1, wherein providing a non-wood bio-mass material comprises providing a biomass material from a crop grown for the production of a biofuel.

3. The method of claim 1, wherein the non-wood biomass material comprises a grass.

4. The method of claim 3, wherein the grass is switchgrass.

5. The method of claim 1, wherein the treating comprises pyrolysis performed under a nitrogen or other inert atmosphere and/or under atmospheric pressure.

6. The method of claim 5, wherein the highest treatment temperature during pyrolysis is about 500° C.

7. The method of claim 5, wherein the highest treatment temperature during pyrolysis is about 400° C.

8. The method of claim 5, wherein the pyrolysis is performed by increasing temperature from room temperature to a highest treatment temperature with a heating rate of about 15° C. per minute.

9. The method of claim 1, wherein the bio-char has an average particle size of about 75 μm or less.

10. A bio-modifier composition produced by the method of claim 1.

11. A bio-modifier composition for asphalt comprising bio-char derived from a non-wood biomass, wherein the bio-char has an average particle size of less than about 150 microns.

12. The bio-modifier composition of claim 11, wherein said bio-char comprises pyrolyzed non-wood biomass.

13. The bio-modifier composition of claim 12, wherein the pyrolyzed non-wood biomass is pyrolyzed grass.

14. The bio-modifier composition of claim 13, wherein the pyrolyzed grass is pyrolyzed switchgrass.

15. The bio-modifier composition of claim 11, wherein the bio-char has an average particle size of less than about 75 microns.

16. The bio-modifier composition of claim 11, wherein the bio-char has a porous and/or rough surface texture.

17. A method of preparing a modified asphalt composition, the method comprising combining a bio-modifier composition comprising bio-char derived from a non-wood biomass with an asphalt composition.

18. The method of claim 17, wherein the combining comprises mixing the asphalt composition with the bio-modifier composition to provide a mixture comprising about 20 weight % or less of the bio-modifier.

19. The method of claim 18, wherein the mixture comprises about 10 weight % or less of the bio-modifier composition.

20. The method of claim 17, wherein the asphalt composition comprises asphalt binder or asphalt binder and aggregate.

21. A modified asphalt composition produced by combining a bio-modifier composition comprising bio-char derived from a non-wood biomass with an asphalt composition.

22. A modified asphalt composition comprising a bio-modifier composition of claim 11.

23. The modified asphalt composition of claim 22, wherein the modified asphalt composition further comprises asphalt binder or asphalt binder and aggregate.

24. The method of claim 7, wherein the pyrolysis is performed by increasing temperature from room temperature to a highest treatment temperature with a heating rate of about 15° C. per minute.

25. A method for preparing a solid bio-modifier composition for asphalt, the method comprising: providing a non-wood bio-mass material; and treating the non-wood biomass material under conditions suitable to produce a solid bio-modifier composition comprising bio-char, wherein the treating comprising pyrolyzing the non-wood biomass under an inert atmosphere and under atmospheric pressure with a highest treatment temperature during pyrolysis of about 400° C.

26. The method of claim 25, wherein the pyrolysis is performed by increasing the temperature from room temperature to the highest treatment temperature with a heating rate of about 15° C.

27. The method of claim 25, wherein the bio-char has an average particle size of about 150 μm or less.

28. A bio-modifier composition produced by the method of claim 25.

29. A modified asphalt composition comprising the bio-modifier composition produced by the method of claim 25.

30. The modified asphalt composition of claim 29, further comprising asphalt binder or asphalt binder and aggregate.

31. The modified asphalt composition of claim 29, wherein the modified asphalt composition comprises about 20 weight % or less of the bio-modifier.

* * * * *